United States Patent
Nakajima

(10) Patent No.: US 10,029,366 B2
(45) Date of Patent: Jul. 24, 2018

(54) CONTROL DEVICE FOR MOTOR DRIVE DEVICE, CONTROL DEVICE FOR MULTI-AXIAL MOTOR, AND CONTROL METHOD FOR MOTOR DRIVE DEVICE

(71) Applicant: CANON KABUSHIKI KAISHA, Tokyo (JP)

(72) Inventor: Yohji Nakajima, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/942,711

(22) Filed: Nov. 16, 2015

(65) Prior Publication Data

US 2016/0144508 A1 May 26, 2016

(30) Foreign Application Priority Data

Nov. 21, 2014 (JP) ................. 2014-236150

(51) Int. Cl.
| | | |
|---|---|---|
| *B25J 9/00* | (2006.01) | |
| *B25J 9/12* | (2006.01) | |
| *B25J 9/16* | (2006.01) | |

(52) U.S. Cl.
CPC ............ *B25J 9/126* (2013.01); *B25J 9/1633* (2013.01); *G05B 2219/37344* (2013.01);
(Continued)

(58) Field of Classification Search
USPC ...... 700/245–264; 318/568.11; 901/2, 9, 10, 901/14, 46
See application file for complete search history.

(56) References Cited

U.S. PATENT DOCUMENTS 3,279,624 A * 10/1966 Devol ............... B25J 9/101
  318/162
4,455,838 A * 6/1984 Junichi ............... F01B 21/04
  60/426

(Continued)

FOREIGN PATENT DOCUMENTS

| CN | 100413657 C | 8/2008 |
|---|---|---|
| CN | 101640511 A | 2/2010 |

(Continued)

OTHER PUBLICATIONS http://maxonmotor.com; "EPOS—Positioning Controller; Application Not Position Regulation with Feed Forward"; Edition May 2008; pp. 1-7; XP055243797.

*Primary Examiner* — Jonathan L Sample
(74) *Attorney, Agent, or Firm* — Canon U.S.A., Inc. IP Division

(57) ABSTRACT

Motion control of a robot arm is performed via a reducer connected to a motor. A controller thereof includes a thrust control unit that generates motor position command value based on an input thrust command value, and a motor control unit that generates a current value based on the motor position command value. The motor control unit feeds back a motor position detected by a motor encoder, and the thrust control unit feeds back thrust detected by a thrust meter. The feedback from the motor control unit suppresses vibration phenomena at the reducer, and the feedback from the thrust control unit suppresses transmission error, thereby enabling motion control of the arm with rapidity and precision.

15 Claims, 20 Drawing Sheets

(52) U.S. Cl.
CPC ........... *G05B 2219/39186* (2013.01); *G05B 2219/41372* (2013.01); *G05B 2219/41428* (2013.01); *Y10S 901/09* (2013.01)

(56) References Cited

U.S. PATENT DOCUMENTS

| | | | | |
|---|---|---|---|---|
| 4,517,853 A * | 5/1985 | Tani | ........................ | B25J 9/041 74/89.32 |
| 4,573,548 A * | 3/1986 | Holland | ................... | B25J 5/007 180/211 |
| 4,611,377 A * | 9/1986 | McCormick | ....... | B23Q 3/15553 29/407.05 |
| 4,657,104 A * | 4/1987 | Holland | ................... | B25J 5/007 180/211 |
| 4,781,103 A * | 11/1988 | Maruyama | ............... | B25J 9/148 414/730 |
| 4,828,453 A * | 5/1989 | Martin | ...................... | B25J 9/06 414/738 |
| 4,925,312 A * | 5/1990 | Onaga | .................... | B25J 9/1633 318/568.22 |
| 5,144,549 A * | 9/1992 | Youcef-Toumi | .... | F16C 32/0444 700/262 |
| 5,349,337 A * | 9/1994 | McCormick | ....... | G05B 19/4166 340/680 |
| 5,397,212 A * | 3/1995 | Watanabe | ................ | B25J 9/041 310/90.5 |
| 5,656,903 A * | 8/1997 | Shui | ........................ | B25J 3/04 318/568.1 |
| 6,028,593 A * | 2/2000 | Rosenberg | ............. | A63F 13/10 345/156 |
| 7,158,112 B2 * | 1/2007 | Rosenberg | ............. | A63F 13/10 345/156 |
| 7,348,747 B1 * | 3/2008 | Theobold | ................ | B25J 5/005 318/568.11 |
| 8,419,804 B2 * | 4/2013 | Herr | ......................... | A61F 2/60 623/24 |
| 9,314,922 B2 | 4/2016 | Dockter | .................... | B25J 3/04 |
| 2006/0170888 A1 * | 8/2006 | Asano | ................ | G03F 7/70725 355/53 |
| 2007/0112466 A1 * | 5/2007 | Ohnishi | ................ | G05B 19/19 700/260 |
| 2007/0162404 A1 * | 7/2007 | Gorelik | ................ | B25J 9/1602 706/2 |
| 2007/0192707 A1 * | 8/2007 | Maeda | ................ | G05B 19/409 715/744 |
| 2007/0200525 A1 * | 8/2007 | Kanaoka | ............. | G05D 1/0208 318/568.21 |
| 2008/0045374 A1 * | 2/2008 | Weinberg | ................ | B25J 9/102 475/342 |
| 2008/0075561 A1 * | 3/2008 | Takemura | ............. | F16F 1/025 414/2 |
| 2009/0115242 A1 * | 5/2009 | Ohtani | .................... | B60T 7/042 303/3 |
| 2009/0178506 A1 * | 7/2009 | Yamamoto | ............... | B25J 9/102 74/490.03 |
| 2009/0272585 A1 * | 11/2009 | Nagasaka | ............... | B25J 9/1633 180/8.6 |
| 2009/0297284 A1 * | 12/2009 | Brown | ............... | G05B 19/4163 408/3 |
| 2010/0113980 A1 * | 5/2010 | Herr | ......................... | A61F 2/60 600/587 |
| 2010/0114329 A1 * | 5/2010 | Casler | ................... | B25J 19/0008 623/24 |
| 2010/0164326 A1 * | 7/2010 | Ebihara | .................. | H02N 2/101 310/323.02 |
| 2010/0332032 A1 * | 12/2010 | Moriyama | ............. | B25J 9/1682 700/258 |
| 2011/0040427 A1 * | 2/2011 | Ben-Tzvi | ................. | B25J 5/005 701/2 |
| 2011/0204838 A1 * | 8/2011 | Nakasugi | ............... | B25J 9/1633 318/689 |
| 2012/0215357 A1 * | 8/2012 | Igarashi | ................. | B25J 9/1641 700/258 |
| 2012/0215358 A1 * | 8/2012 | Gettings | ................. | B25J 5/005 700/259 |
| 2012/0259464 A1 * | 10/2012 | Morioka | ................. | B25J 9/1674 700/254 |
| 2013/0144553 A1 * | 6/2013 | Omata | .................... | G01D 5/245 702/151 |
| 2013/0190926 A1 * | 7/2013 | Motoyoshi | ............. | B25J 9/1653 700/254 |
| 2013/0231778 A1 * | 9/2013 | Ostergaard | ........... | G05B 19/401 700/245 |
| 2014/0060223 A1 * | 3/2014 | Tanaka | ....................... | B25J 9/06 74/89 |
| 2014/0088765 A1 * | 3/2014 | Valpola | .................. | B25J 9/1697 700/259 |
| 2014/0134924 A1 * | 5/2014 | Shinozaki | ............... | B24B 7/228 451/5 |
| 2014/0182806 A1 * | 7/2014 | Moschini | ............. | B22D 17/007 164/457 |
| 2014/0214204 A1 * | 7/2014 | Toshimitsu | ............ | G05B 19/19 700/253 |
| 2014/0277739 A1 * | 9/2014 | Kornbluh | ............... | B25J 9/0006 700/260 |
| 2014/0365003 A1 * | 12/2014 | Takahashi | ................ | B25J 5/007 700/245 |
| 2015/0048724 A1 * | 2/2015 | Ueda | ......................... | B25J 9/10 310/68 B |
| 2015/0127158 A1 * | 5/2015 | Shimodaira | .......... | G05B 19/401 700/258 |
| 2015/0177084 A1 * | 6/2015 | Inoue | .................... | B25J 9/1676 73/862.541 |
| 2015/0224638 A1 * | 8/2015 | Dockter | .................... | B25J 3/04 700/264 |
| 2015/0224639 A1 * | 8/2015 | Dockter | .................... | B25J 3/04 700/264 |
| 2016/0247707 A1 * | 8/2016 | Hashimoto | ....... | H01L 21/67778 |

FOREIGN PATENT DOCUMENTS

| | | |
|---|---|---|
| CN | 101895252 A | 11/2010 |
| CN | 102207145 A | 10/2011 |
| CN | 103825519 A | 5/2014 |
| EP | 0334613 A2 | 9/1989 |
| EP | 0559397 A2 | 9/1993 |
| EP | 2361736 A2 | 8/2011 |
| EP | 2431137 A2 | 3/2012 |
| EP | 2492057 A1 | 8/2012 |
| JP | 61-201304 A | 9/1986 |
| JP | 7-225615 A | 8/1995 |
| JP | 2011-176913 A | 9/2011 |

\* cited by examiner

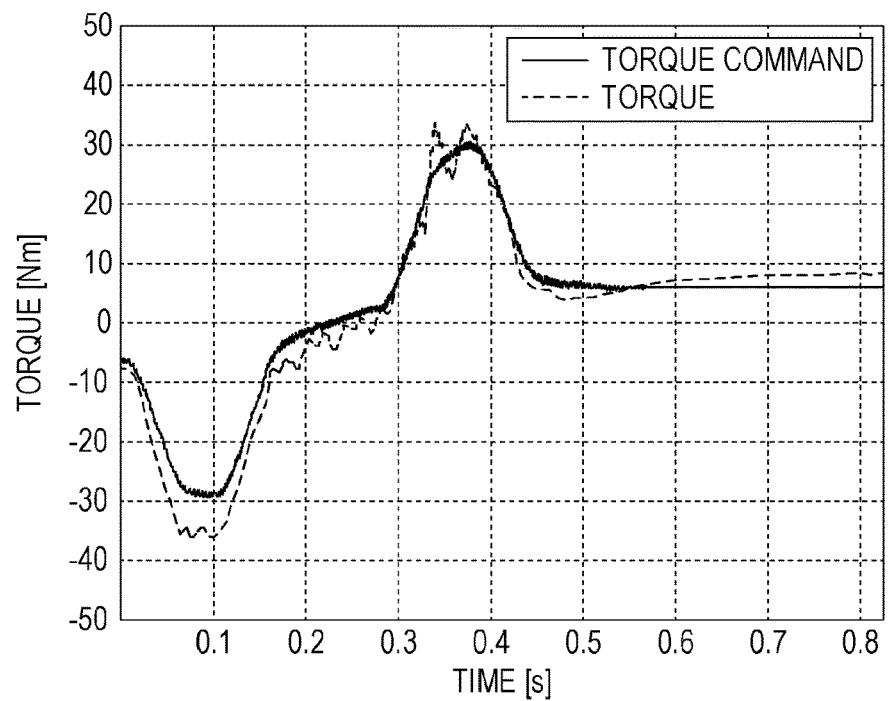
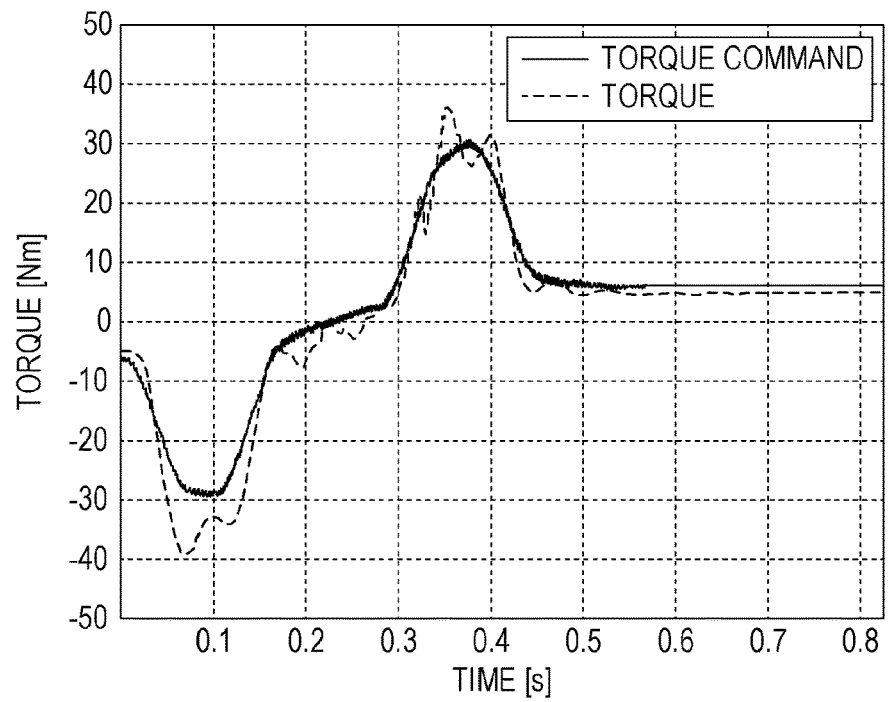

CONTROL DEVICE FOR MOTOR DRIVE DEVICE, CONTROL DEVICE FOR MULTI-AXIAL MOTOR, AND CONTROL METHOD FOR MOTOR DRIVE DEVICE

BACKGROUND OF THE INVENTION

Field of the Invention

The present invention relates to a control device for a motor drive device that performs motion control of a moving member via a transmission mechanism connected to a motor, a control device of a multi-axial motor drive device where multiple motor drive devices are serially connected, and a control method for the motor drive device.

Description of the Related Art

As of recent, robots are being developed to perform various tasks instead of humans. To realize robots that can perform precise and speedy work like human hands, both high precision and high speed must be realized in robot actions. Such robots use motors as the power source to drive joints. Many use transmission mechanisms such as reducers, ball screws, and so forth, to increase motor thrust and convert rotary movement into linear movement.

However, transmission mechanisms have inherent factors that impede increased precision. Examples include twisting, angle error due to meshing of cogs in reducers, backlash, friction, minute vibrations of small parts, angle error due to deformation of ball screws, resonance of screws, lost motion, and so forth. Accordingly, even if the motor is driven with precision, the precision of the robot actions deteriorates due to the above-listed factors.

Also, transmission mechanisms are more flexible in comparison with structures such as robot frames, and accordingly twist and behave like elastics. Accordingly, a moving member regarding which movement is to be controlled, that is connected to the transmission mechanism, exhibits single harmonic motion as to the motor, which also causes deterioration in precision. Further, reactive force of the single harmonic motion acts on the motor, resulting in deviation of motor position, which causes even further deterioration in precision.

There are two general methods to control motors for robot joints and the like, semi-closed control (e.g., see Japanese Patent Laid-Open No. 61-201304) and full-closed control (e.g., see Japanese Patent Laid-Open Nos. 7-225615 and 2011-176913). Semi-closed control is a method where the position of the output shaft of the motor (output member) is detected, and the detection results are fed back to a position command of the motor. Full-closed control is a method where the position of a moving member that is subjected to moving drive by the motor via a transmission mechanism such as a reducer or the like, and the detection results are fed back to a position command of the motor. Generally, semi-closed control has quick action speed but low positional precision, while on the other hand full-closed control has highly positional precision but slow action speed. Thus, it can be said precision and rapidity are in a tradeoff relationship.

It would seem possible to prevent positional deviation of the motor in semi-closed control by output thrust that counters the counteractive force. However, if the motor continues to output thrust countering the counteractive force and there is no positional deviation, feedback cannot be performed, so as a result, the single harmonic motion continues unchecked. Once single harmonic motion becomes sustained, the single harmonic motion generated each time twisting occurs in the transmission mechanism that is operating is amplified, and may become mechanical resonance.

Accordingly, positional deviation of the motor due to reactive force from the elastic force of the transmission mechanism cannot be prevented even in semi-closed control, if the operating speed (gain) is raised. If positional deviation of the power source due to reactive force from elastic force at the transmission mechanism is to be prevented, the operating speed (gain) has to be lowered and driving control of the motor performed so that no single harmonic motion occurs, even in semi-closed control.

Accordingly, Japanese Patent Laid-Open No. 61-201304 proposes semi-closed control where a motion equation is prepared beforehand that takes into consideration the mechanical rigidity of the transmission mechanism, and the calculation results thereof are added to the command value of the semi-closed control. This aims to realize both precision and rapidity.

On the other hand, Japanese Patent Laid-Open No. 7-225615 proposes full-closed control where the position of the moving member is detected by a sensor and subtracted from a target value, the position of the motor is corrected according to the different in position, and the position of the moving member is made to copy the target value. Japanese Patent Laid-Open No. 2011-176913 proposes full-closed control where the difference between the position of a vibrating moving member and the position of the motor is obtained, a torque value is calculated taking torsional stiffness into consideration, and controlling so that this matches a torque target value.

The semi-closed control in Japanese Patent Laid-Open No. 61-201304 is capable of high-speed operations taking advantage of the characteristics of semi-closed control. However, prediction of transmission error that changes according to temperature variation and over time is difficult, and accordingly there is a problem that satisfying the required precision is difficult.

In the other hand, the full-closed control in Japanese Patent Laid-Open No. 7-225615 has a problem that vibration phenomena cannot be measured, and accordingly, increasing operation speed (gain of motor correction) results in oscillation. The full-closed control in Japanese Patent Laid-Open No. 7-225615 thus has a problem that operation speed (positional correction) is sluggish.

Japanese Patent Laid-Open No. 2011-176913 has been conceived to raise speed in full-closed control. The full-closed control in Japanese Patent Laid-Open No. 2011-176913 employs a configuration where the primary factor for sluggishness in positional correction has been eliminated, so it had been thought that both precision and rapidity could be realized in robot actions. However, full-closed control differs from semi-closed control with regard to the point that a transmission mechanism exists between sensor and motor, and transmission mechanisms are characterized by having backlash, friction, and natural vibration at frequencies higher than the above-described single harmonic motion. The full-closed control in Japanese Patent Laid-Open No. 2011-176913 also has backlash, friction, and natural vibration at frequencies higher than the above-described single harmonic motion, and accordingly there has been the problem that increasing operation speed (gain of motor correction) results in oscillation. Accordingly, there has been an issue that gain cannot be sufficiently raised even in the full-closed control in Japanese Patent Laid-Open No. 2011-176913 since high-order vibrations will occur, and consequently high-speed driving cannot be performed.

SUMMARY OF THE INVENTION

The present invention provides a control device for a motor drive device that can control movement of a moving member with rapidity and precision, a control device of a multi-axial motor drive device, and a control method for the motor drive device.

The present invention provides a control device for a motor drive device configured to perform motion control of a moving member via a transmission mechanism connected to a motor. The control device includes: a thrust control unit configured to generate a position command value for the motor based on an input thrust command value; and a motor control unit configured to generate a current value to control the motor based on the position command value for the motor. The motor control unit executes a first feedback control according to detection results of a motor position detecting unit configured to detect a position of an output member that outputs rotation of the motor. The thrust control unit executes a second feedback control according to detection results of a thrust detecting unit configured to detect thrust occurring at the moving member.

The present invention provides a control device for a multi-axial motor drive device having a plurality of motor drive devices performing motion control of moving members via transmission mechanisms connected to motors, where the moving member of one motor drive device is serially connected so as to support the motor of another motor drive device. The control device includes, corresponding to each motor drive device: a drive device control unit configured to generate a thrust command value, based on an externally input position command value for the moving member; a thrust control unit configured to generate a position control value of the motor, based on the generated thrust command value; and a motor control unit configured to generate a current value to control the motor, based on the position command value for the motor. Each motor control unit executes a first feedback control according to detection results of a motor position detecting unit configured to detect a position of an output member that outputs rotation of the motor. Each thrust control unit executes a second feedback control according to detection results of a thrust detecting unit configured to detect thrust occurring at the moving member. Each drive device control unit executes a third feedback control in accordance with detection results from a moving member position detecting unit configured to detect the position of the moving member.

The present invention provides a control method of a motor drive device configured to perform motion control of a moving member via a transmission mechanism connected to a motor. The method includes: a thrust control procedure to generate a position command value for the motor based on an input thrust command value; a motor control procedure to generate a current value to control the motor based on the position command value for the motor; and a feedback procedure, where a first feedback control is performed in the motor control procedure, according to detection results of a motor position detecting unit configured to detect a position of an output member that outputs rotation of the motor, and a second feedback control is performed in the thrust control procedures, according to detection results of a thrust detecting unit configured to detect thrust occurring at the moving member.

According to the present invention, the thrust control unit executes the second feedback control according to the detection results of the thrust detecting unit that detects thrust occurring at the moving member. Accordingly, the thrust transmitted to the moving member via the transmission mechanism can be made to copy the thrust command value that has been input, so the operations of the moving member can be made to be precise. Further, the thrust generated at the moving member also includes transmission error components that change according to temperature variation and over time, so feedback control where transmission error is also effectively suppressed can be executed.

The motor control unit executes the first feedback control according to the detection results of the motor position detecting unit that detects the position of the output member output motor rotations, to the position command value of the motor generated by the thrust control unit. Elastic counteraction of the transmission mechanism occurring in the motor includes components of vibration phenomena due to the effects of backlash, friction, natural vibration, and so forth at the transmission mechanism, and these vibration phenomena can be suppressed with rapidity.

Enabling operation speed to be increased while suppressing the vibration phenomena and transmission error due to the transmission mechanism in this way enables motion control of the moving member to be performed with rapidity and precision. Further, effective suppression of the vibration phenomena and transmission error means that the gain of motor correction can be raised, and further operation speed can be raised. Accordingly, an arrangement that has the precision of full-closed control and motion speed equivalent to semi-closed control can be realized.

Further features of the present invention will become apparent from the following description of exemplary embodiments with reference to the attached drawings.

BRIEF DESCRIPTION OF THE DRAWINGS

FIGS. 5A and 5B are diagrams illustrating experiment results of torque control of a single-axis robot, FIG. 5A showing experiment results of control according to the first embodiment and FIG. 5B showing experiment results of control according to a comparative example.

DESCRIPTION OF THE EMBODIMENTS

First Embodiment

Figure 1:
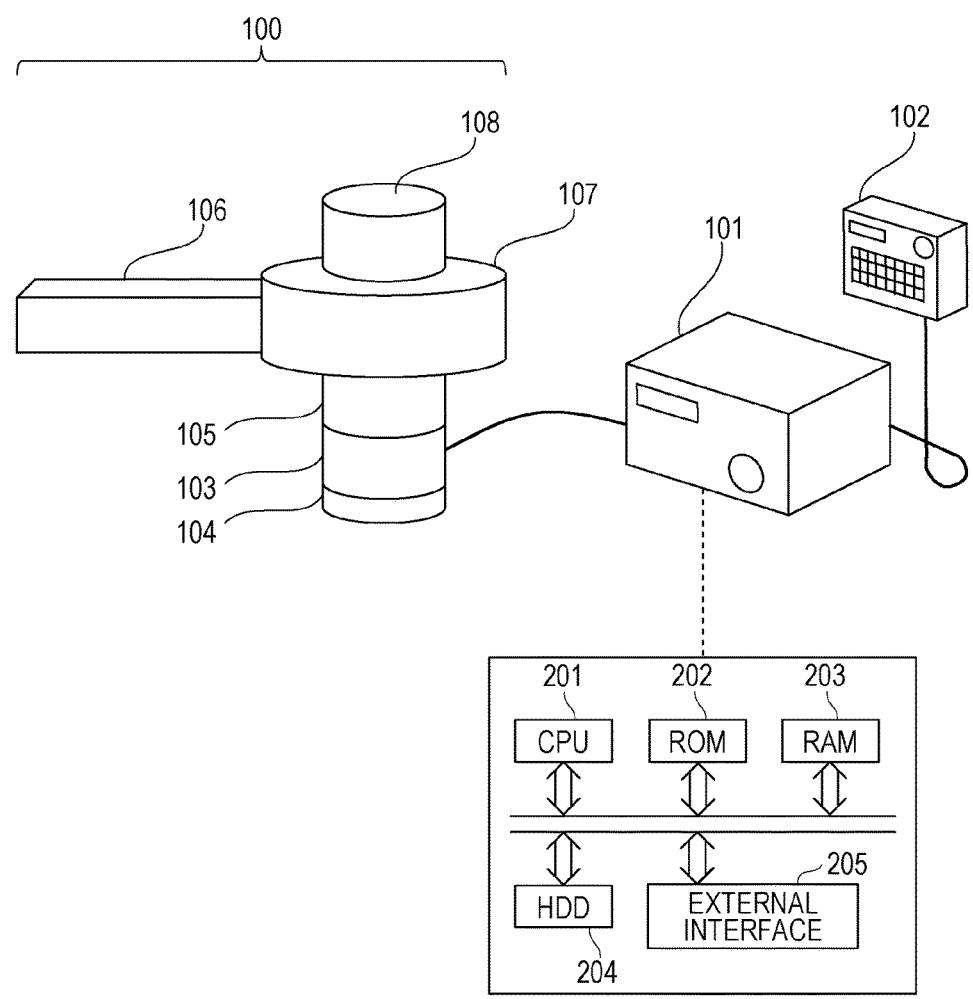
FIG. 1 is an overall schematic diagram illustrating a single-axis robot system.
Figure 2:
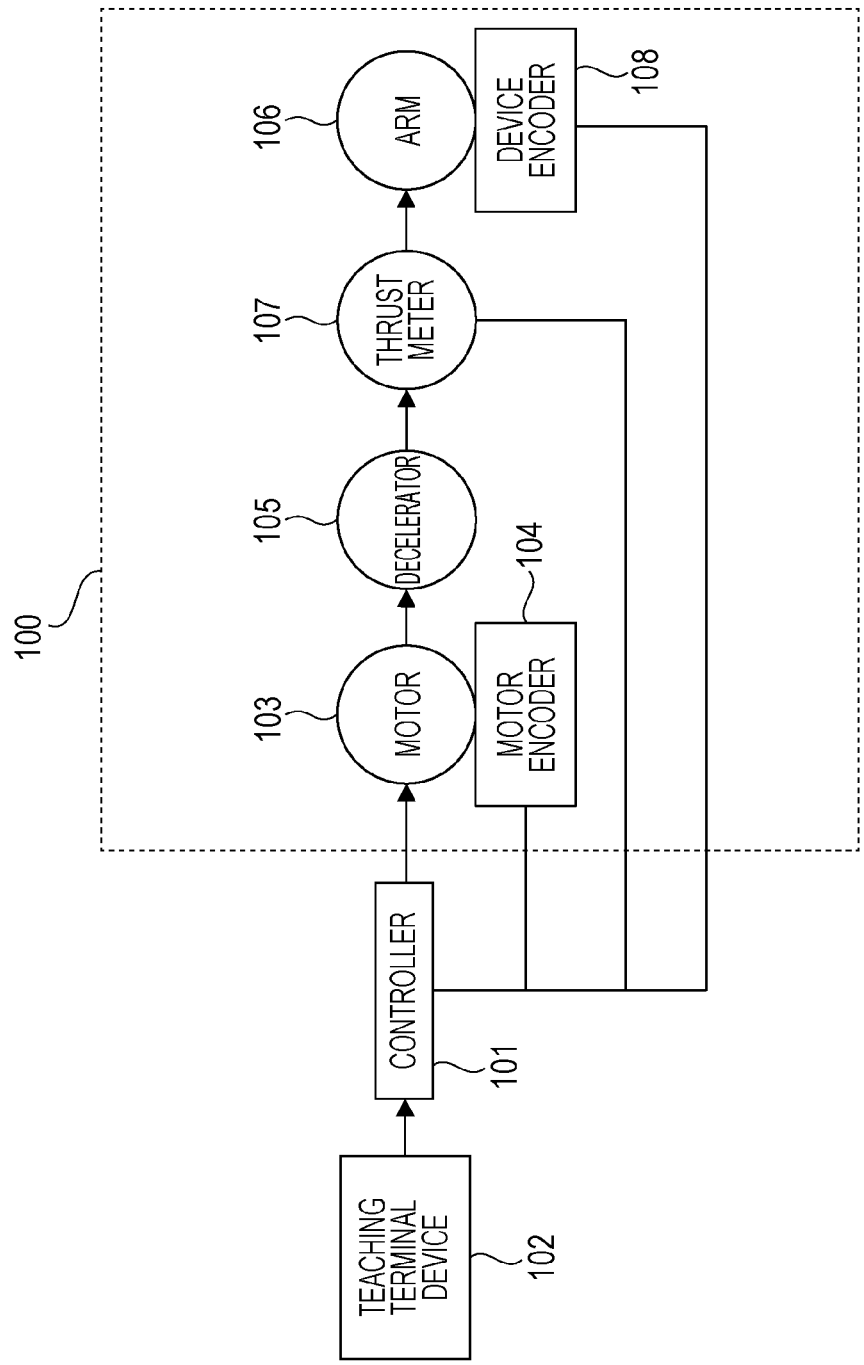
FIG. 2 is a schematic diagram illustrating a single-axis robot system.
Figure 3:
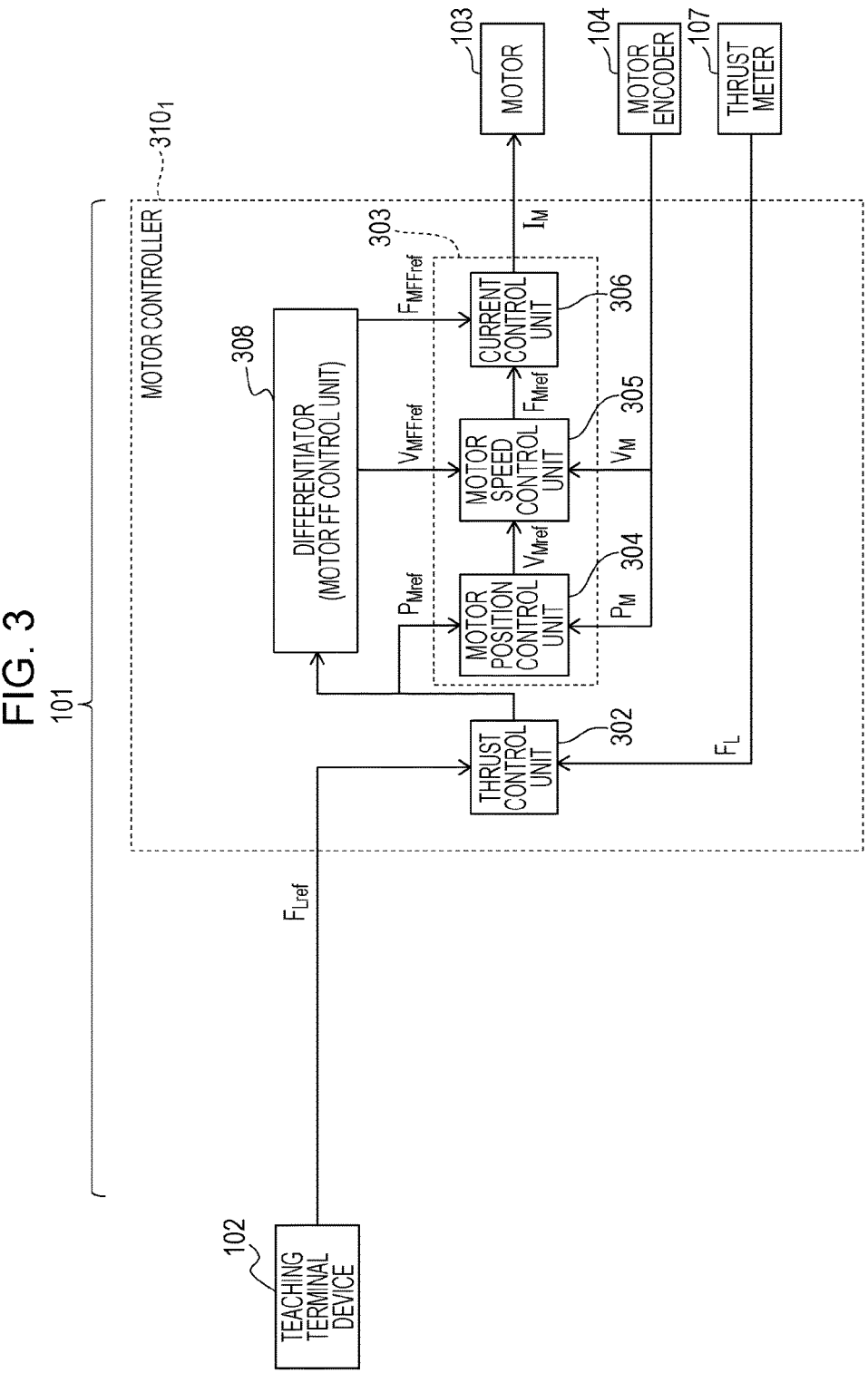
FIG. 3 is a block diagram illustrating a control system of a controller according to a first embodiment.
Figure 4:
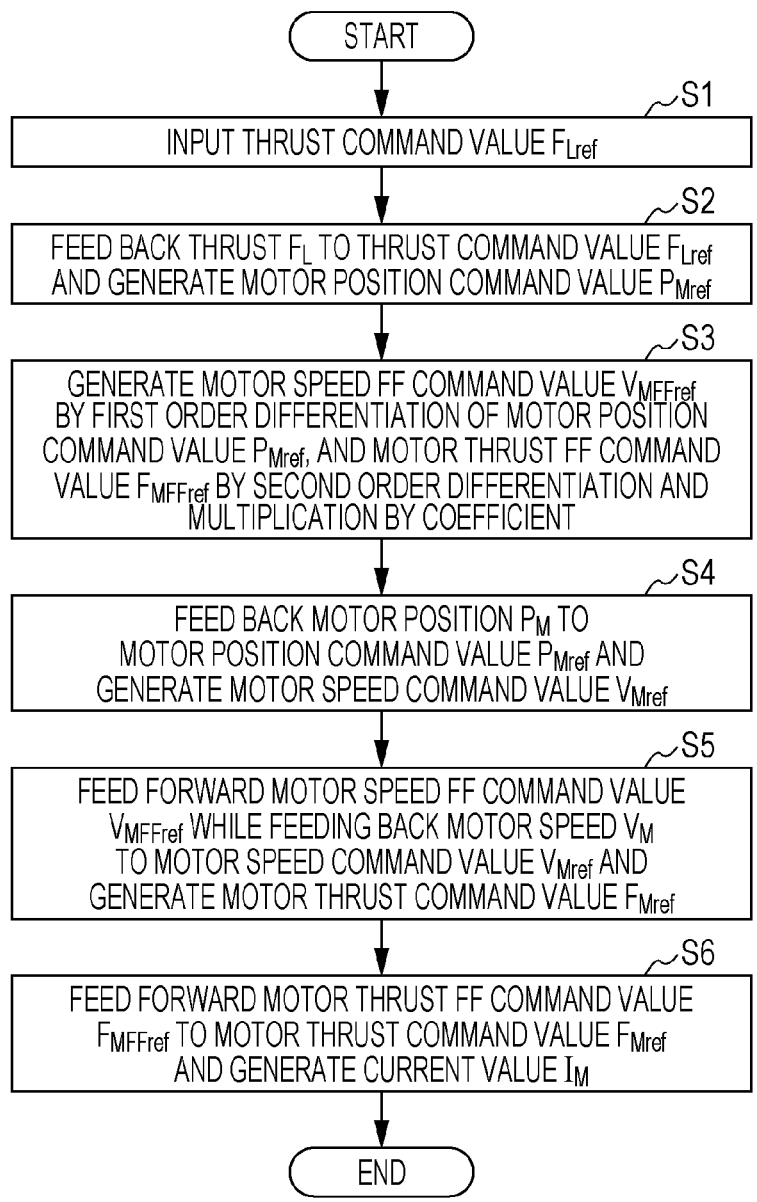
FIG. 4 is a flowchart illustrating control according to the first embodiment.

A first embodiment of the present invention will be described below with reference to FIGS. 1 through 5B. FIG. 1 is an overall schematic diagram illustrating a single-axis robot system. FIG. 2 is a schematic diagram illustrating a single-axis robot system. FIG. 3 is a block diagram illustrating a control system of a controller according to a first embodiment. FIG. 4 is a flowchart illustrating control according to the first embodiment. FIGS. 5A and 5B are diagrams illustrating experiment results of torque control of a single-axis robot, in which FIG. 5A shows experiment results of control according to the first embodiment and FIG. 5B shows experiment results of control according to a comparative example. A single-axis robot system $1_1$ illustrated in FIGS. 1 and 2 has generally the same configuration in the later-described second through fifth embodiments as well, so the drawings are used in common. However, the first embodiment may be provided without having a later-described device encoder 108.

The single-axis robot system $1_1$ is configured including a single-axis robot arm (motor drive device) 100 that has a single joint, a controller (control device for motor drive device) 101, and a teaching terminal device (teaching pendant) 102. The teaching terminal device 102 is a device for the user to provide the controller 101 with instructions to operate the robot arm 100, and includes various types of switches, levers, a display panel, and so forth, operated by an operator, as illustrated in FIG. 1. Teaching point information can be output from the teaching terminal device 102 as position command values for the robot arm 100, and drive torque information can be output as thrust command values of the robot arm 100.

On the other hand, the robot arm 100 is configured including a motor 103, a motor encoder (motor position detecting unit) 104, a reducer (transmission mechanism) 105, and an arm (moving member) 106. The single-axis robot arm 100 further includes a thrust meter (thrust detecting unit) 107 and the device encoder (moving member position detecting unit) 108. Generally, the combination of the motor 103 and the reducer 105 is defined as a joint that performing motion driving of the arm 106.

The motor 103 is electrically connected to the controller 101, so that the rotational state of an output shaft (output member), omitted from illustration, is controlled by the current value output from the controller 101. The motor encoder 104 detects the rotational position of the output shaft of the motor 103. The reducer 105 is mechanically connected to the output shaft of the motor 103, and reduces the output rotations of the motor 103 for transmission to the arm 106. The thrust meter 107 is configured using a distortion gauge or the like, for example, and detects thrust of the arm 106 transmitted to the arm 106 from distortion (twisting) of a frame (output shaft of the reducer 105) configured using an elastic member. The device encoder 108 detects the rotational position of the arm 106.

The controller 101 is a so-called server control device (computer), and includes a central processing unit (CPU) 201, ROM 202, RAM 203, a hard disk drive (HDD) 204, an external interface 205, and so forth. Command values from the teaching terminal device 102 (position command value $P_{Lref}$ and thrust command value $F_{Lref}$) can be input from the external interface 205, as illustrated in FIG. 1. Further, motor position $P_M$, which is the angle of the motor 103 from the motor encoder 104, can be input from the external interface 205 (capable of input of feedback). Also, thrust $F_L$ of the arm 106 from the thrust meter 107 can be input from the external interface 205 (capable of input of feedback). Moreover, device position $P_L$, which is the angle of the arm 106 from the device encoder 108, can be input from the external interface 205 (capable of input of feedback). Moreover yet, current value $I_M$ can be output to the motor 103 from the external interface 205. That is to say, the controller 101 performs various types of feedback control based on input of command values from the teaching terminal device 102, and outputs commands in the form of current values to the motor 103.

These motor position $P_M$ of the motor 103, thrust $F_L$ of the arm 106, and device position $P_L$ of the arm 106, are used for feedback control by various units which perform arithmetic processing using the CPU 201 of the controller 101, which will be described in detail later with reference to FIG. 3. Note that the units illustrated in FIG. 3 are processes that function by a computer-readable program recorded and stored in a recording medium such as the ROM 202 or HDD 204 or the like being executed, represented in the form of functional blocks. Of course, the units illustrated as functional blocks are not restricted to be achieved by software functions, and may be achieved by a hardware configuration (electronic arithmetic operation circuit). The arithmetic processing thereof from input to output will be described below with reference to FIG. 3.

The controller 101 has a motor controller $310_1$. The motor controller $310_1$ according to the first embodiment illustrated in FIG. 3 includes a thrust control unit 302, a motor control unit 303, and a differentiator (motor feed-forward (FF) control unit) 308. The thrust control unit 302 generates a position command value for the motor 103 (hereinafter referred to as "motor position command value") $P_{Mref}$ based on the thrust command value $F_{Lref}$ input from the teaching terminal device 102. At this time, the thrust control unit 302 executes feedback control corresponding to the thrust $F_L$ that is the detection results of the thrust meter 107 detecting the thrust occurring at the arm 106 (second feedback control).

The differentiator 308 generates a feed-forward value for feed-forward control of the motor control unit 303, in accordance with the motor position command value $P_{Mref}$ which the thrust control unit 302 has generated.

The motor control unit 303 includes a motor position control unit 304, a motor speed control unit 305, and a current control unit 306, and generates the current value $I_M$ that controls the motor 103, based on the motor position command value $P_{Mref}$. At this time, the motor control unit 303 executes feedback control according to the motor position $P_M$ and motor speed $V_M$, which are the detection results of the motor encoder 104 that detects the rotational position of the motor 103 (first feedback control).

Now, control performed by the controller 101 will be described following the flowchart in FIG. 4, with reference to FIG. 3. First, an operator operates the teaching terminal device 102 to output a thrust command value $F_{Lref}$ from the teaching terminal device 102, which is input to the thrust control unit 302 (S1). Next, the thrust control unit 302 generates a motor position command value $P_{Mref}$ by feeding back thrust $F_L$ detected by the thrust meter 107 to a thrust command value $F_{Lref}$ (thrust control procedure) (S2). The differentiator 308 generates a motor speed FF command value $V_{MFFref}$ by first order differentiation of the motor position command value $P_{Mref}$ and generates a motor thrust FF command value $R_{MFFref}$ by second order differentiation thereof and multiplication by a coefficient (S3).

Inside the motor control unit 303, the motor position control unit 304 preforms feedback of the motor position $P_M$ detected by the motor encoder 104 to the motor position command value $P_{Mref}$ (feedback process) to generate a motor speed command value $V_{Mref}$ (S4). The motor speed control unit 305 then feeds back the motor speed $V_M$ obtained by differentiation of the motor position $P_M$ from the motor encoder 104 to the motor speed command value $V_{Mref}$ (feedback process), while at the same time feeding forward the motor speed FF command value $V_{MFFref}$. Thus, the motor speed control unit 305 generates a motor thrust command value $F_{Mref}$ (S5). The current control unit 306 then feeds forward the motor thrust FF command value $F_{MFFref}$ to the motor thrust command value $F_{Mref}$, and generates the current value $I_M$ to be output to the motor 103 (motor control process, S6).

The above-described control is executed every control cycle. The shorter the control cycle is, the better the calculation precision is, and vibration can be suppressed, but more calculating resources are needed.

FIG. 5A illustrates experiment results of the single-axis robot system $1_1$ controlled as described above. The horizontal axis represents time in units of seconds (s), and the vertical axis represents torque in units of Newton meters (Nm). Driving conditions were torque of −30 Nm to 30 Nm, and torque increase/decrease time of 0.5 s. It can be seen from the experiment results that the torque of the arm 106 was driven from −30 Nm to 30 Nm in response to the torque command serving as the thrust command value. It can also be seen from the experiment results that the torque of the arm 106 followed the torque command with precision and rapidity.

FIG. 5B illustrates experiment results of driving with general semi-closed control, as a comparative example. Although a full-closed control comparative example is conceivable, performance is lower than semi-closed control due to insufficient control band, so semi-closed control was used for comparison here. The driving conditions were the same as the above. It can be seen by comparing with the experiment results according to the present embodiment that the present embodiment exhibited less vibrations, and error was smaller by 5 Nm. It was thus confirmed that control according to the present embodiment is better.

Thus, in the control by the controller 101 according to the present embodiment, the thrust control unit 302 performs feedback control of the thrust $F_L$ generated at the arm 106 to the input thrust command value $F_{Lref}$. Accordingly, the thrust $F_L$ transmitted to the arm 106 via the reducer 105 can be made to copy after the input thrust command value $F_{Lref}$, and the arm 106 can be operated precisely. The thrust $F_L$ generated at the arm 106 also includes transmission error components that change according to temperature variation and over time, so feedback control where transmission error is also effectively suppressed can be executed.

The motor control unit 303 feeds back the motor position $P_M$ and motor speed $V_M$ to the motor position command value $P_{Mref}$ which the thrust control unit 302 has generated, at the motor position control unit 304 and motor speed control unit 305. Accordingly, the feedback control of the motor position $P_M$ is less readily affected by disturbance as compared to performing feedback of the motor position $P_M$ to the motor position command value $P_{Mref}$ as in general semi-closed control. Elastic counteraction of the reducer 105 occurring in the motor 103 includes components of vibration phenomena due to the effects of backlash, friction, natural vibration, and so forth at the reducer 105, but these vibration phenomena can be suppressed with rapidity.

Enabling operation speed to be increased while suppressing the vibration phenomena and transmission error due to the reducer 105 in this way enables motion control of the arm 106 to be performed with rapidity and precision. Further, effective suppression of the vibration phenomena and transmission error means that the gain of motor correction can be raised, and further operation speed can be raised. Accordingly, and arrangement that has the precision of full-closed control and motion speed equivalent to semi-closed control can be realized.

Using feed-forward control by way of the differentiator 308 also makes the vibration phenomena difficult to spread, and further responsivity can be improved. Note that this feed-forward control can be omitted, though performance will drop. In this case, the motor speed FF command value $V_{MFFref}$ and motor thrust command value $F_{Mref}$ are set to zero.

Although the present embodiment has been described by way of an example where a single-axis robot arm 100 is controlled, but application is not restricted to this structure. Although the present embodiment has been described with regard to a rotating joint, the transmission mechanism may be a prismatic joint configured as a rack-and-pinion mechanism or the like. Further, the transmission mechanism is not restricted to being a reducer, and may be an amplifying mechanism.

Also, although the present embodiment has been described with regard to an arrangement where the detection results of the motor encoder 104 are fed back to both the motor position control unit 304 and the motor speed control unit 305, but this is not restrictive, and suppression effects of the vibration phenomena can be yielded to a certain extent by using just one or the other. Further, an arrangement may be made where the detection results of the motor encoder 104 are differentiated to calculate motor acceleration $A_M$, which is then fed back to the current control unit 306. This arrangement can also achieve suppression effects of the vibration phenomena to a certain extent.

Second Embodiment

Figure 6:
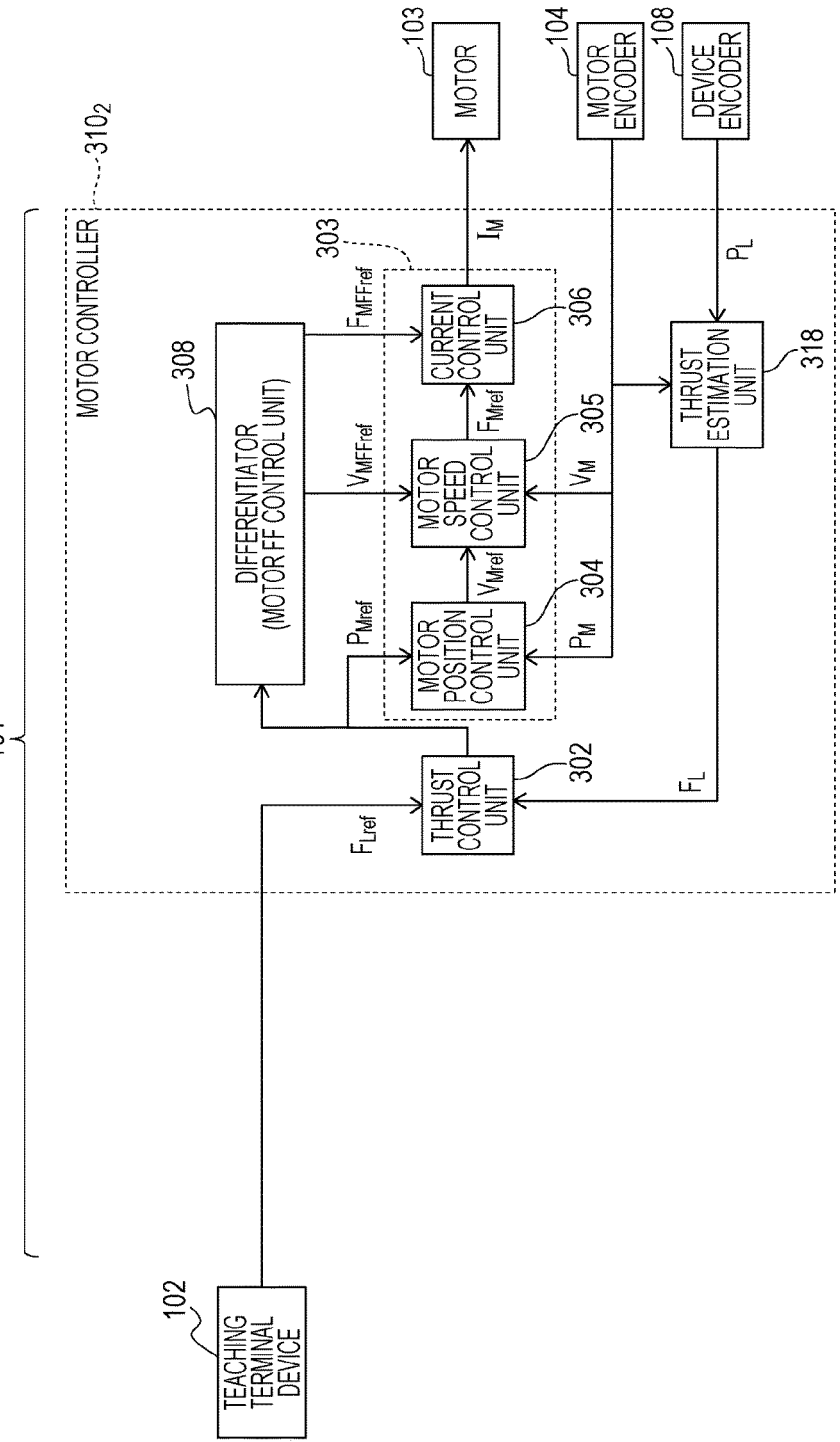
FIG. 6 is a block diagram illustrating a control system of a controller according to a second embodiment.

Next, a second embodiment, which is a partial modification of the above-described first embodiment, will be described with reference to FIG. 6. FIG. 6 is a block diagram illustrating a control system of a controller according to the second embodiment.

The first embodiment has been described as detecting thrust $F_L$ transmitted to the arm 106 using the thrust meter 107, and the second embodiment is a modification regarding the detection technique. That is to say, a motor controller $310_2$ in the controller 101 according to the present embodiment has a thrust estimation unit (thrust detecting unit) 318. The relational expression $$F_L = (P_M - P_L) \times K$$

holds where K represents a joint rigidity coefficient including the rigidity of the reducer 105. The thrust estimation unit 318 calculates the thrust $F_L$ estimated by providing to this expression the motor position $P_M$ detected at the motor encoder 104 and the device position $P_L$ detected at the device encoder 108.

Providing the thrust estimation unit 318 to the motor controller $310_2$ as in the second embodiment enables the thrust meter 107 to be done away with. Note that the thrust $F_L$ can be calculated by multiplying acceleration, obtained by second order differentiation of the device position $P_L$ detected at the device encoder 108, by the weight of the arm 106. However, in a case of providing more joints to the leading edge side of the arm 106 to configure an articulated robot, for example, it becomes difficult to distinguish whether this is acceleration due to driving this joint or acceleration due to driving another joint, so this technique is not usable.

Third Embodiment

Figure 7:
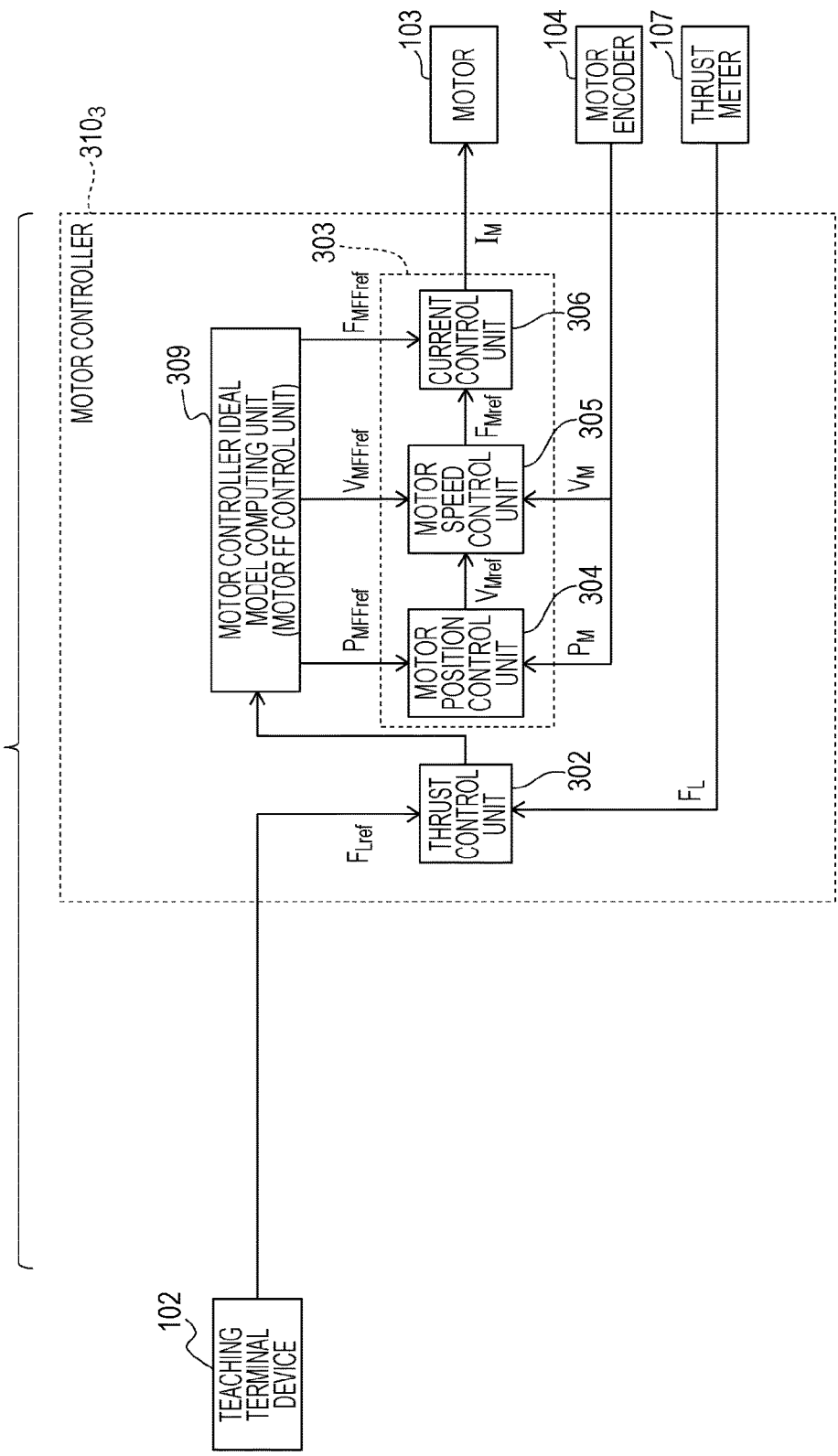
FIG. 7 is a block diagram illustrating a control system of a controller according to a third embodiment.
Figure 8:
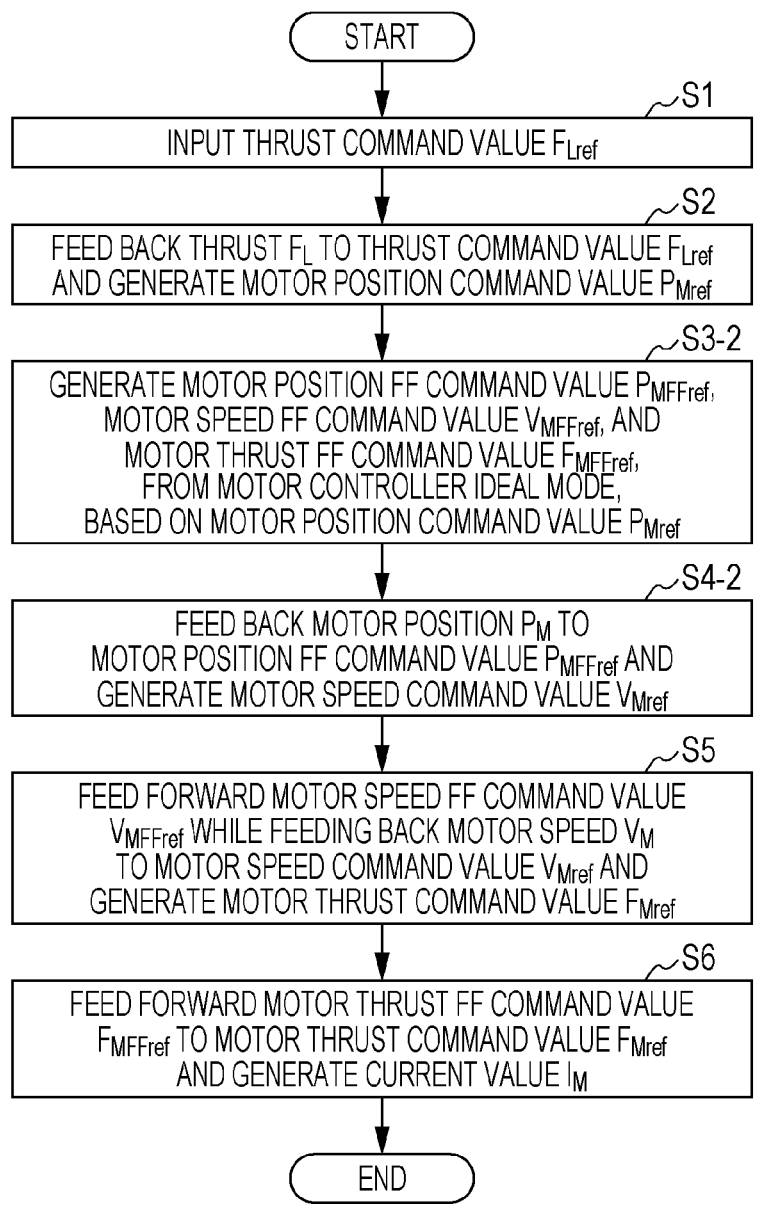
FIG. 8 is a flowchart illustrating control according to the third embodiment.

Next, a third embodiment, which is a partial modification of the above-described first embodiment, will be described with reference to FIGS. 7 and 8. FIG. 7 is a block diagram illustrating a control system of a controller according to the third embodiment, and FIG. 8 is a flowchart illustrating control according to the third embodiment.

The third embodiment has a motor controller $310_3$ provided with a motor controller ideal model computing unit (motor FF control unit) 309. The motor controller ideal model computing unit 309 has an ideal model where the motor controller has been modeled, instead of the differentiator 308 in the first embodiment. The ideal model of the motor controller is made up of a motor inertia virtual model where the inertia of the motor 103 has been modeled, and a circuit virtual model where a feeder circuit that controls power feed to the motor 103 has been modeled. The motor controller ideal model computing unit 309 assumes that a predetermined control gain has been set to the circuit virtual model, and in a case where a motor position command value $P_{Mref}$ is input, executes model computation regarding the motor 103. Accordingly, the motor controller ideal model computing unit 309 has functions to calculate a motor position FF command value $P_{MFFref}$, the motor speed FF command value $V_{MFFref}$ and the motor thrust FF command value $F_{MFFref}$. The motor position FF command value $P_{MFFref}$, motor speed FF command value $V_{MFFref}$ and motor thrust FF command value $F_{MFFref}$ are calculated as follows.

$$V_{MMmref} = PID(P_{Mref} - P_{MFFref})$$

$V_{MMref}$: model motor speed command $$F_{MFFref} = PID(V_{MMref} - V_{MFFref})$$

$$ACC_{MFFref} = F_{MFFref}/M_M$$

$M_m$: motor inertia or mass $$V_{MFFref} = \int ACC_{MFFref} dt$$

$$P_{MFFref} = \int V_{MFFref} dt$$

In the control of the controller 101 configured in this way, changes are made to the control illustrated in FIG. 4 in the first embodiment, in the form of steps S3-2 and S4-2, as illustrated in FIG. 8. Specifically, steps S1 and S2 are first executed in the same way as in the first embodiment. In step S3-2, the motor controller ideal model computing unit 309 generates the motor position FF command value $P_{MFFref}$, motor speed FF command value $V_{MFFref}$ and motor thrust FF command value $F_{MFFref}$ from the motor controller ideal model. In step S4-2, the motor position control unit 304 feeds back the motor position $P_M$ detected by the motor encoder 104 to the motor position FF command value $P_{MFFref}$ and generates the motor speed command value $V_{Mref}$. Thereafter, steps S5 and S6 are executed in the same way as in the first embodiment, thereby generating the current value $I_M$ for output to the motor 103.

The above-described control is executed every control cycle. The shorter the control cycle is, the better the calculation precision is, and vibration can be suppressed, but more calculating resources are needed.

Although omitted from illustration in FIG. 7, a disturbance correction function is preferably added in the form of a device observer unit. The device observer unit estimates the disturbance Dist acting on the output shaft of the motor 103, multiplies by a coefficient to generate disturbance thrust Fd, and adds to the motor thrust command value $F_{Mref}$. Thus, the disturbance acting on the arm 106 can be reflected in the thrust of the motor 103, poor positional precision due to interference torque between the output shaft of the motor 103 and arm 106 and calculation error thereof, and variation in friction, can be prevented, thereby improving the precision of the device position $P_L$. The disturbance Dist is computed as follows.

$$Dist = ACC_M \times M_M - I_M \times K_F$$

$K_F$: thrust constant

Thus, the motor controller ideal model computing unit 309 can compute the motor position FF command value $P_{MFFref}$, motor speed FF command value $V_{MFFref}$ and motor thrust FF command value $F_{MFFref}$ from the motor control ideal model, whereby the vibration phenomena can be suppressed.

Fourth Embodiment

Figure 9:
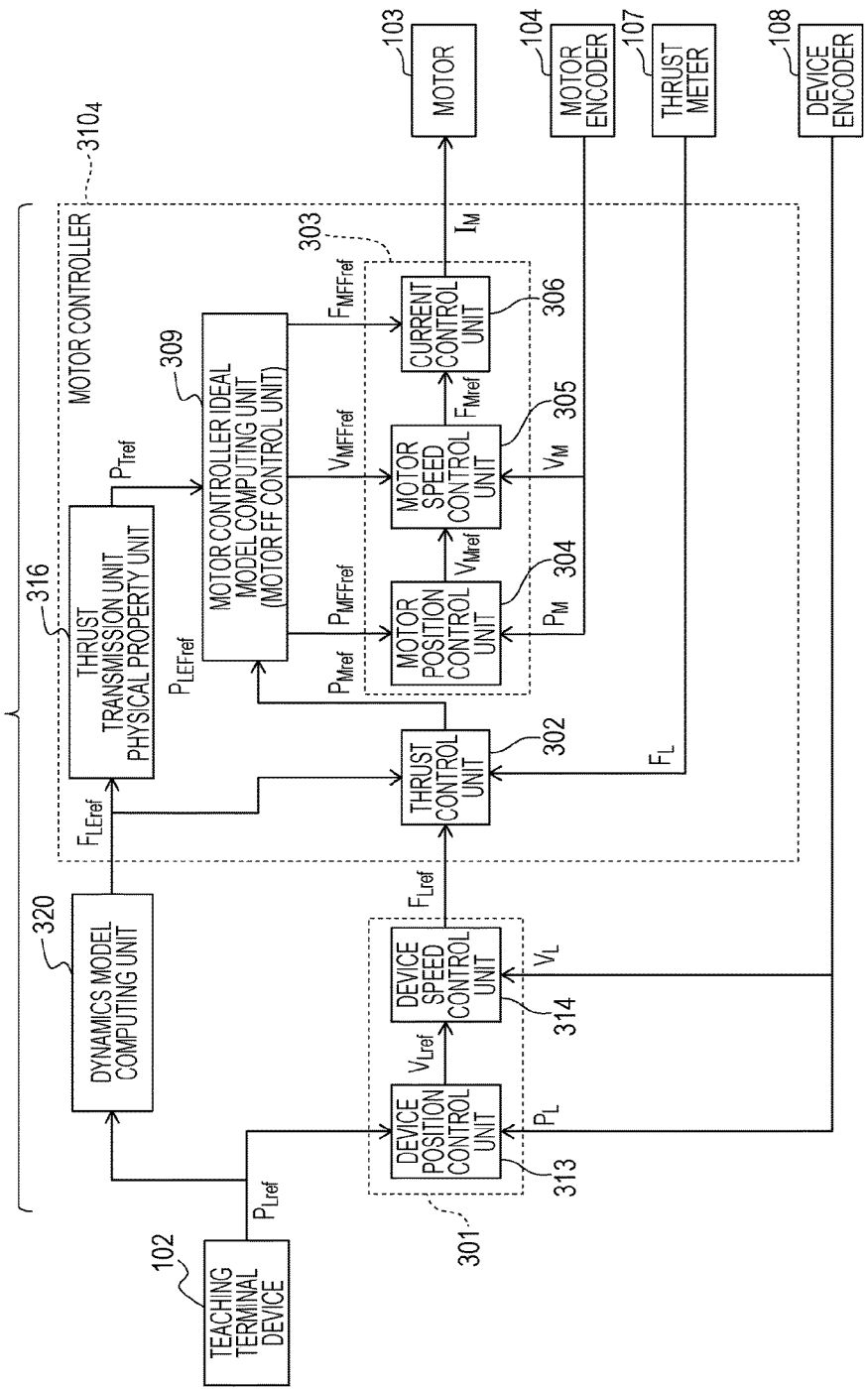
FIG. 9 is a block diagram illustrating a control system of a controller according to a fourth embodiment.
Figure 10:
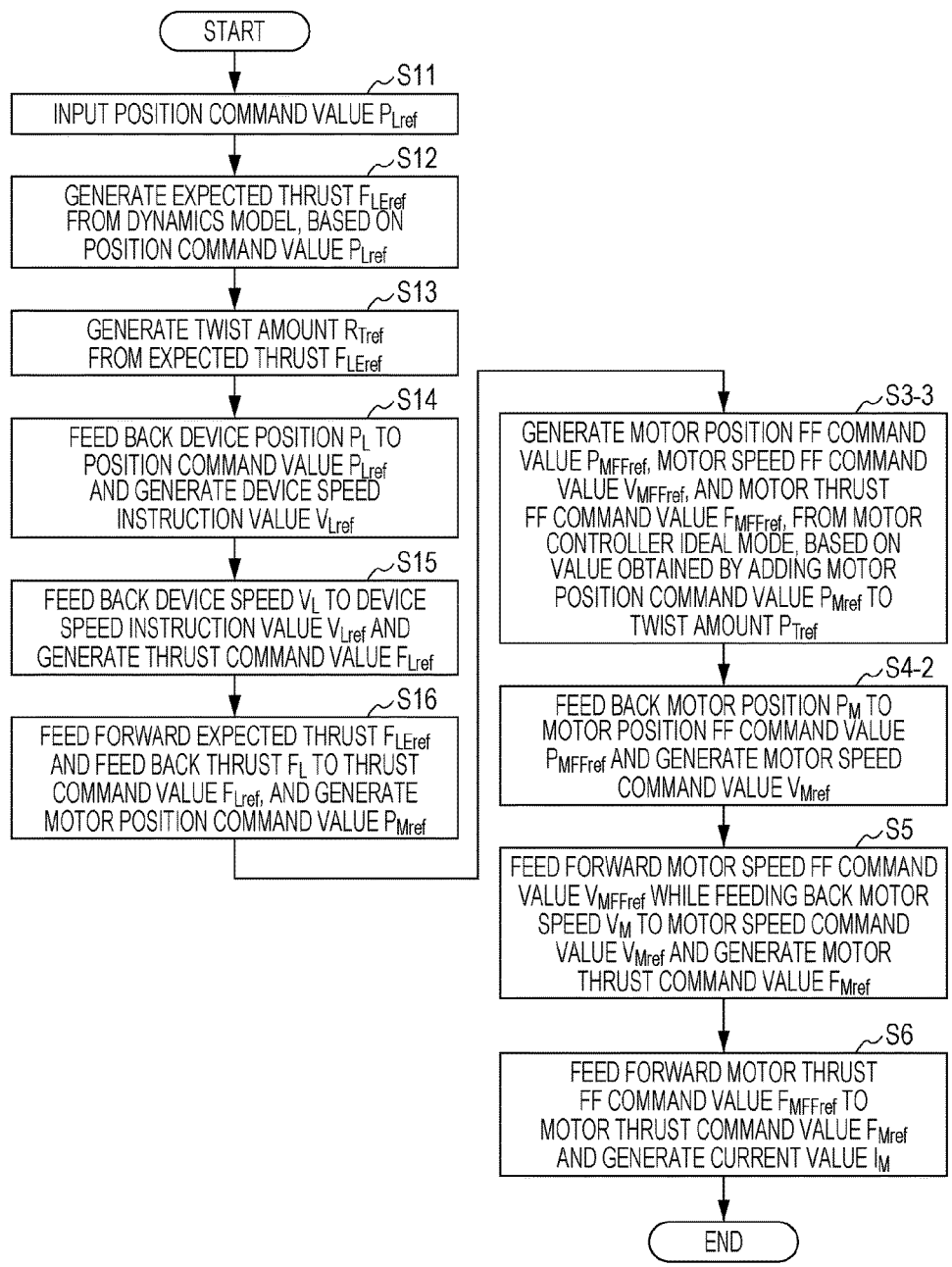
FIG. 10 is a flowchart illustrating control according to the fourth embodiment.

Next, a fourth embodiment, which is a partial modification of the above-described third embodiment, will be described with reference to FIGS. 9 and 10. FIG. 9 is a block diagram illustrating a control system of a controller according to the fourth embodiment. FIG. 10 is a flowchart illustrating control according to the fourth embodiment.

The fourth embodiment is the configuration of the third embodiment in which the controller 101 has been provided with a dynamics model computing unit (dynamics model control unit) 320 and a thrust transmission unit physical property unit 316. The controller 101 further is provided with a device controller (drive device control unit) 301 having a device position control unit (moving member position control unit) 313 and device speed control unit (moving member speed control unit) 314. The dynamics model computing unit 320 has a dynamics model where the robot arm 100 has been modeled according to dynamics. The dynamics model is a model including arm length, arm weight, and product of inertia (link parameter of robot arm 100). The dynamics model computing unit 320 calculates the position command value $P_{Lref}$ input from the teaching terminal device 102, and speed command value and acceleration command value obtained by differentiation thereof. The dynamics model computing unit 320 further functions to calculate, based on these values, an expected thrust (prediction value of dynamic thrust) $F_{LEref}$ necessary to performing motion control of the arm 106 according to the dynamics model. The expected thrust $F_{LEref}$ is calculated taking into consideration weight, viscosity, friction, and so forth, as well. Also, the thrust transmission unit physical property unit (twist amount control unit) 316 calculates beforehand a prediction amount of twist amount that realizes the expected thrust $F_{LEref}$ (hereinafter referred to as "twist amount") $P_{Tref}$. The twist amount $P_{Tref}$ can be calculated from the following expression, which is given as one example.

$$P_{Fref} = F_{Tref}/K$$

K: joint rigidity coefficient

The device controller 301 has the device position control unit 313 and device speed control unit 314, and calculates the thrust command value $F_{Lref}$ to be input to the thrust control unit 302 based on the position command value $P_{Lref}$ input from the teaching terminal device 102. At this time, the device controller 301 executes feedback control according to the device position (arm position) $P_L$ which is the detection results of the device encoder 108 that detects the rotational position of the arm 106 and device speed (arm speed) $V_L$ (third feedback control).

In the control of the controller 101 configured in this way, changes are made to the control illustrated in FIG. 8 in the third embodiment, in the form of steps S11 through S16 being added, and step S3-3 being changed, as illustrated in FIG. 10. First, an operator operates the teaching terminal device 102 to output a position command value $P_{Lref}$ from the teaching terminal device 102, which is input to the dynamics model computing unit 320 and device position control unit 313 (S11). The dynamics model computing unit 320 generates the expected thrust $F_{LEref}$ from the dynamics model based on the position command value $P_{Lref}$ (S12). The thrust transmission unit physical property unit 316 generates the twist amount $P_{Lref}$ that realizes the expected thrust $F_{LEref}$ (S13).

On the other hand, the device position control unit 313 feeds back the device position $P_L$ detected by the device encoder 108 to the position command value $P_{Lref}$, and generates a device speed command value $V_{Lref}$ (S14). The device speed control unit 314 feeds back to the device speed command value $V_{Lref}$ the device speed $V_L$ obtained by differentiation of the device position $P_L$ detected by the device encoder 108, and generates the thrust command value $F_{Lref}$ (S15). The thrust control unit 302 feeds forward the expected thrust $F_{LEref}$ to the thrust command value $F_{Lref}$ while at the same time feeding back of the thrust $F_L$ detected by the thrust meter 107, and thus generates the motor position command value $P_{Mref}$ (S16).

The motor controller ideal model computing unit 309 first adds the motor position command value $P_{Mref}$ and the twist amount $P_{Mref}$. Next, based on the added value thereof, the motor controller ideal model computing unit 309 generates the motor position FF command value $P_{MFFref}$, motor speed FF command value $V_{MFFref}$, and motor thrust FF command value $F_{MFFref}$, from the motor control ideal model (S3-3). Thereafter, steps S4-2, S5, and S6 are executed in the same way as in the third embodiment, thereby generating the current value $I_M$ to be output to the motor 103.

The above-described control is executed every control cycle. The shorter the control cycle is, the better the calculation precision is, and vibration can be suppressed, but more calculating resources are needed.

The dynamics model computing unit 320 has been added to the fourth embodiment, so when the position command value $P_{Lref}$ is input, the expected thrust $F_{LEref}$ can be calculated. The thrust command value $F_{Lref}$ is generated based on the expected thrust $F_{LEref}$, and the current value $I_M$ is generated based thereupon, so the position of the arm 106 is controlled so as to match the dynamics model of the robot arm 100, meaning that control is performed in detail and speedily.

Also, the thrust transmission unit physical property unit 316 has been added, so the twist amount $P_{Tref}$ that realizes the expected thrust $F_{LEref}$ can be calculated beforehand. This twist amount $P_{Tref}$ is input to the motor control unit 303 and reflected in the current value $I_M$, so the responsivity of thrust $F_L$ of the arm 106 corresponding to the expected thrust $F_{LEref}$ also improves. Accordingly, the responsivity of the device position $P_L$ as to the position command value $P_{Lref}$ also improves.

Further, the device controller 301 has been added, so the device position $P_L$ and device speed $V_L$ can be fed back. Accordingly, even in a case where the device position $P_L$ deviates from the position command value $P_{Lref}$ due to modeling error, calculation error, or the like in the expected thrust $F_{LEref}$, feedback control can be performed so that the device position $P_L$ copies the position command value $P_{Lref}$, so the amount of misalignment can be reduced.

Description has been made regarding the present embodiment that all three of the dynamics model computing unit 320, thrust transmission unit physical property unit 316, and device controller 301, have been provided. However, the dynamics model computing unit 320, thrust transmission unit physical property unit 316, and device controller 301 each are independent functions, so an arrangement may be made having only one or two of these, in which case the respective effects can be obtained.

Fifth Embodiment

Figure 11:
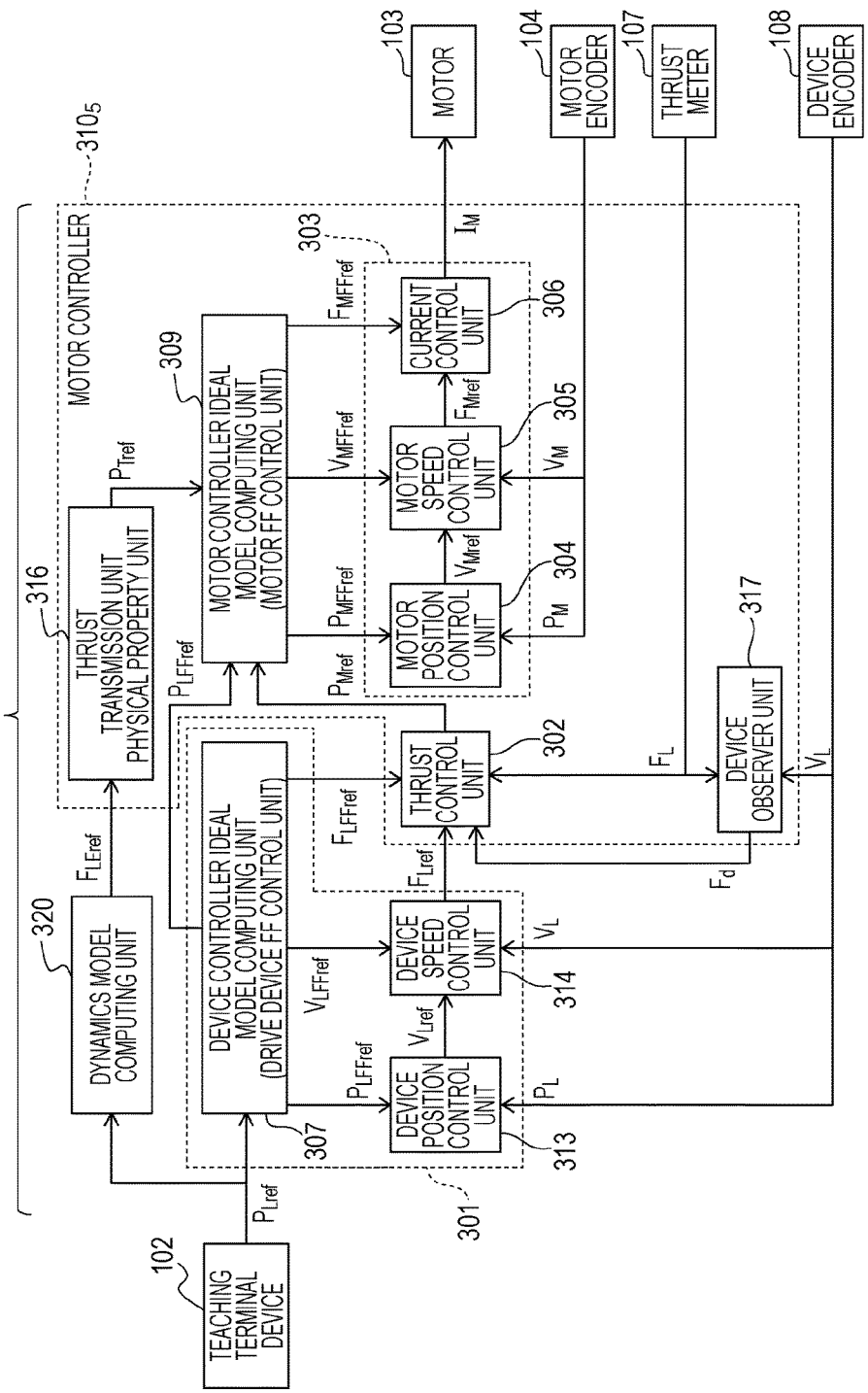
FIG. 11 is a block diagram illustrating a control system of a controller according to a fifth embodiment.
Figure 12:
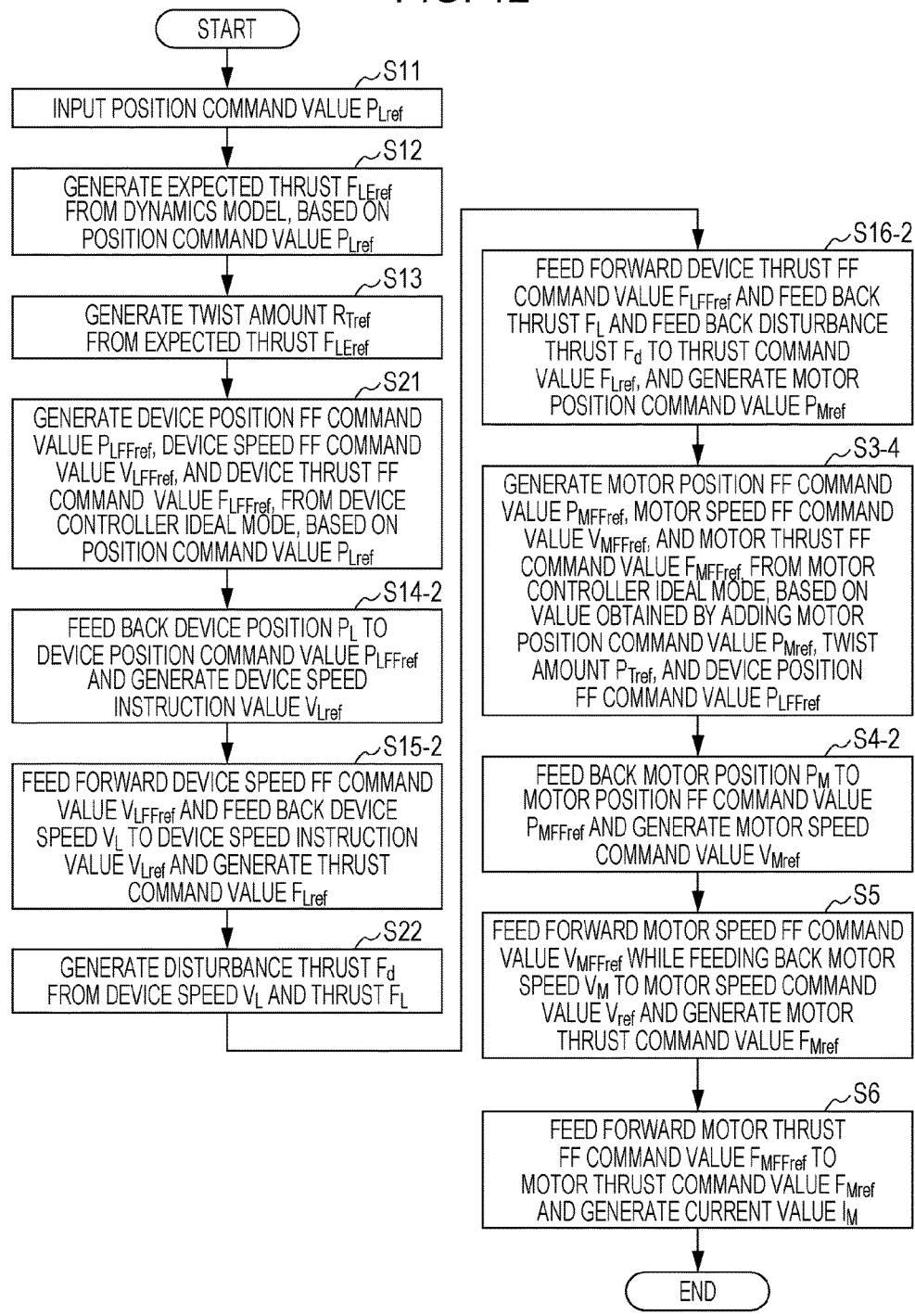
FIG. 12 is a flowchart illustrating control according to the fifth embodiment.
Figure 13A:
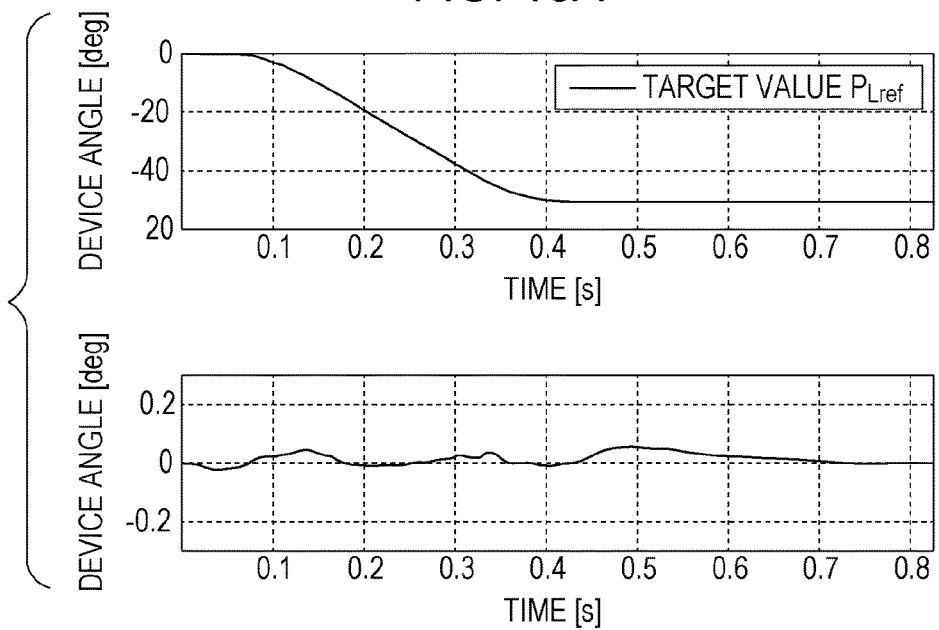
FIGS. 13A and 13B are diagrams illustrating experiment results of position control of a single-axis robot, FIG. 13A showing experiment results of control according to the fifth embodiment and FIG. 13B showing experiment results of control according to a comparative example.
Figure 13B:
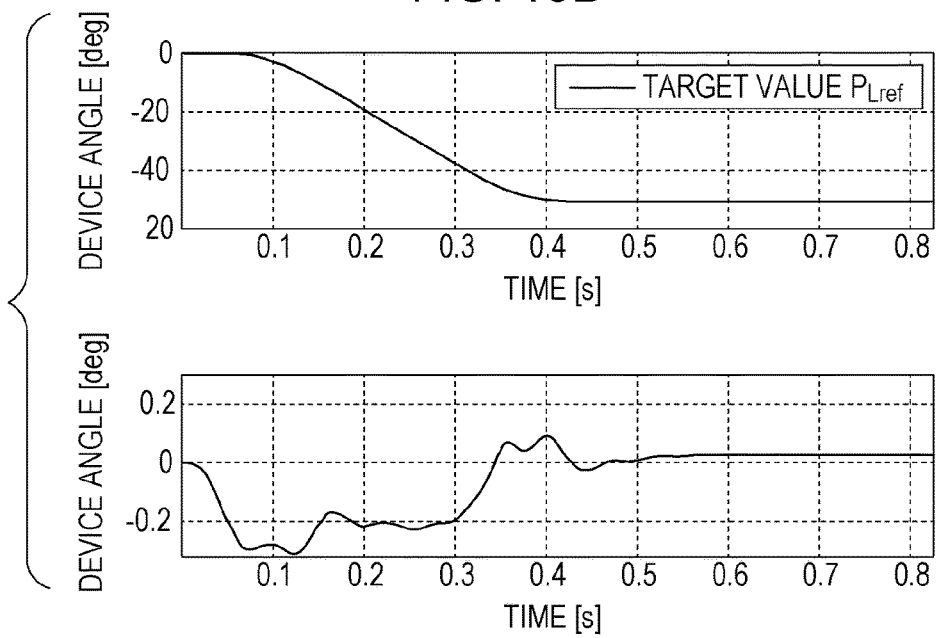

Next, a fifth embodiment, which is a partial modification of the above-described fourth embodiment, will be described with reference to FIGS. 11 through 13B. FIG. 11 is a block diagram illustrating a control system of a controller according to the fifth embodiment. FIG. 12 is a flowchart illustrating control according to the fifth embodiment. FIGS. 13A and 13B are diagrams illustrating experiment results of position control of a single-axis robot. FIG. 13A shows experiment results of control according to the fifth embodiment and FIG. 13B shows experiment results of control according to a comparative example.

The fifth embodiment is the configuration of the fourth embodiment in which the controller 101 has been provided with a device controller ideal model computer unit (drive device FF control unit) 307, and a device observer unit (monitoring control unit) 317. The device controller ideal model computer unit 307 has a device controller ideal model to enable ideal behavior of the arm 106. The device controller ideal model is made up of a virtual model of the entire robot arm 100, and a virtual model of a control circuit that controls the position and speed of the arm 106. The device controller ideal model computer unit 307 assumes that a predetermined control gain has been set to the virtual model of the control circuit within the device controller ideal model, and in a case where the position command value $P_{Lref}$ has been input from the teaching terminal device 102, executes model computation regarding the arm 106. Thus, the device controller ideal model computer unit 307 has the functions of calculating a device position FF command value $P_{LFFref}$m, device speed FF command value $V_{LFFref}$, and device thrust FF command value $F_{LFFref}$. The device position FF command value $P_{LFFref}$, device speed FF command value $V_{LFFref}$, and device thrust FF command value $F_{LFFref}$ are calculated as follows.

$$V_{LFFref} = PID(P_{Lref} - P_{LFFref})$$

$$F_{LFFref} = PID(V_{LFFref} - V_{LFFref})$$

$$ACC_{LFFref} = F_{LFFref}/M_L$$

$M_L$: motor inertia or mass $$V_{LFFref} = \int ACC_{LFFref} dt$$

$$P_{LFFref} = \int V_{LFFref} dt$$

$$V_{MLref} = PID(P_{Lref} - P_{LEFref})$$

$V_{MLref}$: Model device speed command

The device observer unit 317 estimates the disturbance Dist acting on the output shaft of the motor 103, multiplies by a coefficient to generate disturbance thrust Fd, and feeds back to the motor thrust command value $F_{Mref}$ (fourth feedback control). The disturbance Dist is calculated by dividing, by mass or second moment of inertia, the difference of device acceleration $A_L$ obtained by differentiation of device speed $V_L$ and expected device speed obtained by multiplying thrust $F_L$ by mass or second moment of inertia.

In the control of the controller 101 configured in this way, changes are made to the control illustrated in FIG. 10 in the fourth embodiment, in the form of steps S21 and S22 having been added, and steps S14-2, S15-2, S16-2, and S3-4 having been changed, as illustrated in FIG. 12. First, an operator operates the teaching terminal device 102 to output a position command value $P_{Lref}$ from the teaching terminal device 102, which is input to the dynamics model computing unit 320 and device position control unit 313 (S11). The dynamics model computing unit 320 generates the expected thrust $F_{LEref}$ from the dynamics model based on the position command value $P_{Lref}$ (S12). The thrust transmission unit physical property unit 316 generates the twist amount $P_{Lref}$ that realizes the expected thrust $F_{LEref}$ (S13).

On the other hand, the device controller ideal model computer unit 307 generates the device position FF command value $P_{LFFref}$, device speed FF command value $V_{LFFref}$, and device thrust FF command value $F_{LFFref}$ from the device controller ideal model based on the position command value $P_{Lref}$ (S21). The device position control unit 313 feeds back the device position $P_L$ detected by the device encoder 108 to the device position FF command value $P_{LFFref}$ and generates the device speed command value $V_{Lref}$ (S14-2). The device speed control unit 314 feeds forward the device speed FF command value $V_{LFFref}$ to the device speed command value $V_{Lref}$ while also feeding back the device speed $V_L$ obtained by differentiation of the device position $P_L$ from the device encoder 108, and generates the thrust command value $F_{Lref}$ (S15-2). The device observer unit 317 generates the disturbance thrust Fd from the device speed $V_L$ obtained from the device position $P_L$ output from the device encoder 108 and the thrust $F_L$ detected by the thrust meter 107 (S22). The thrust control unit 302 feeds forward the device thrust FF command value $F_{LFFref}$ to the thrust command value $F_{Lref}$ while feeding back thrust $F_L$ and further feeding back disturbance thrust Fd, and generates the motor position command value $P_{Mref}$ (S16-2).

The motor controller ideal model computing unit 309 first adds the motor position command value $P_{Mref}$, twist amount $P_{Tref}$, and device position FF command value $P_{LFFref}$.

The motor controller ideal model computing unit 309 then generates the motor speed FF command value $V_{MFFref}$, motor thrust FF command value $F_{MFFref}$, and motor position FF command value $P_{LFFref}$, from the motor control ideal model, based on the added value (S3-4). Thereafter, steps S4-2, S5, and S6 are executed in the same way as in the fourth embodiment, thereby generating the current value $I_M$ for output to the motor 103.

The above-described control is executed every control cycle. The shorter the control cycle is, the better the calculation precision is, and vibration can be suppressed, but more calculating resources are needed.

The device controller ideal model computer unit 307 has been added in the fifth embodiment described above. Accordingly, the device speed FF command value $V_{LFFref}$ and device thrust FF command value $F_{LFFref}$ that realize the device position FF command value $P_{LFFref}$ are fed forward, improving the responsivity of the device position FF command value $P_{LFFref}$. That is to say, responsivity is improved by adding the device controller ideal model computer unit 307. However, there is an issue that performing feedforward where the position command value $P_{Lref}$ is added to the motor position command value $P_{Mref}$ causes mismatch between the target value of the device controller 301 and the value fed forward to the motor position command value $P_{Mref}$ and precision deteriorates. In order to deal with this issue, adding the device position FF command value $P_{LFFref}$ to the motor position command value $P_{Mref}$ causes the target value of the device controller 301 and the value fed forward to the motor position command value $P_{Mref}$ to match, and thus deterioration in precision can be prevented.

Also, the device observer unit 317 has been added. As a result, deterioration in positional precision due to interference torque between the motor 103 and arm 106 and calculation error thereof, and variation in friction, can be prevented, thereby improving the precision of the device position $P_L$.

FIG. 13A illustrates experiment results of the single-axis robot system $1_1$ controlled as described above. This experiment was performed using the robot arm 100 which is a rotational joint, so the position thereof is represented in units of degrees. In FIG. 13A, the vertical axis represents the device angle, and the horizontal axis represents time in seconds (s). The driving conditions were −50 degrees in movement amount and movement time of 0.5 s. It can be seen that when driven from 0 to −50 degrees by the position command value $P_{Lref}$ as in the upper graph, the greatest positional deviation was 0.05 degrees as shown in the lower graph, which is minute. There was hardly any deviation occurring at all during acceleration, either.

FIG. 13B illustrates experiment results controlled according to general semi-closed control as a comparative example. Although the driving conditions were the same as those above, the positional deviation when accelerating was found to be 0.3 degrees, which is large in comparison with the experiment results of the present embodiment, despite the conditions not being strict. That is to say, the positional deviation when accelerating has been cut to ⅙ by the present embodiment.

The single-axis robot system $1_2$ according to the present embodiment is controlled so as to operate the arm 106 over a path defined by multiple teaching point strings provided beforehand. The path can be followed from the start point to the end point of one action with rapidity and precision, without any vibrations being generated in the robot due to thrust interference between the output shaft of the motor 103 and the arm 106, i.e., at the reducer 105.

Sixth Embodiment

Figure 14:
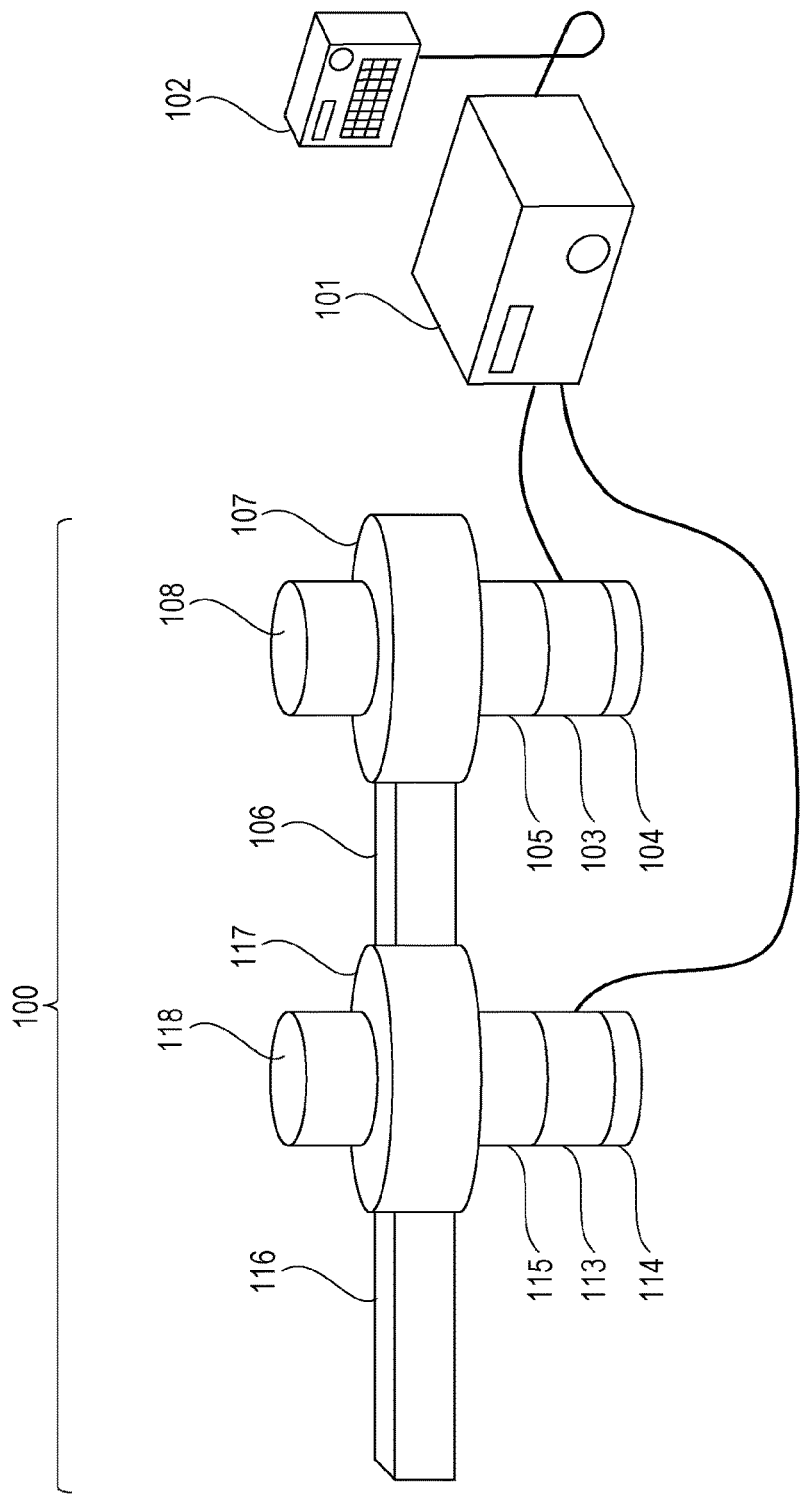
FIG. 14 is an overall schematic diagram illustrating a biaxial robot system.

Next, a sixth embodiment, which is a partial modification of the above-described fifth embodiment, will be described with reference to FIGS. 14 and 15. FIG. 14 is an overall schematic diagram illustrating a biaxial robot system, and FIG. 15 is a block diagram illustrating a control system of a controller according to the sixth embodiment in the biaxial robot system.

A biaxial robot system $1_2$ illustrated in FIG. 14 has a second joint and an arm 116 driven by that joint serially connected to the arm 106 of the single-axis robot system $1_1$ illustrated in FIG. 1. That is to say, a biaxial robot arm (multi-axial motor drive device) 100 according to the sixth embodiment includes the motor 103, motor encoder 104, reducer 105, arm 106, thrust meter 107, and device encoder 108. The robot arm 100 further includes a motor 113, motor encoder 114, reducer 115, arm 116, thrust meter 117, and device encoder 118, supported by the arm 106. The controller 101 is connected to the two motors 103 and 113.

Figure 15:
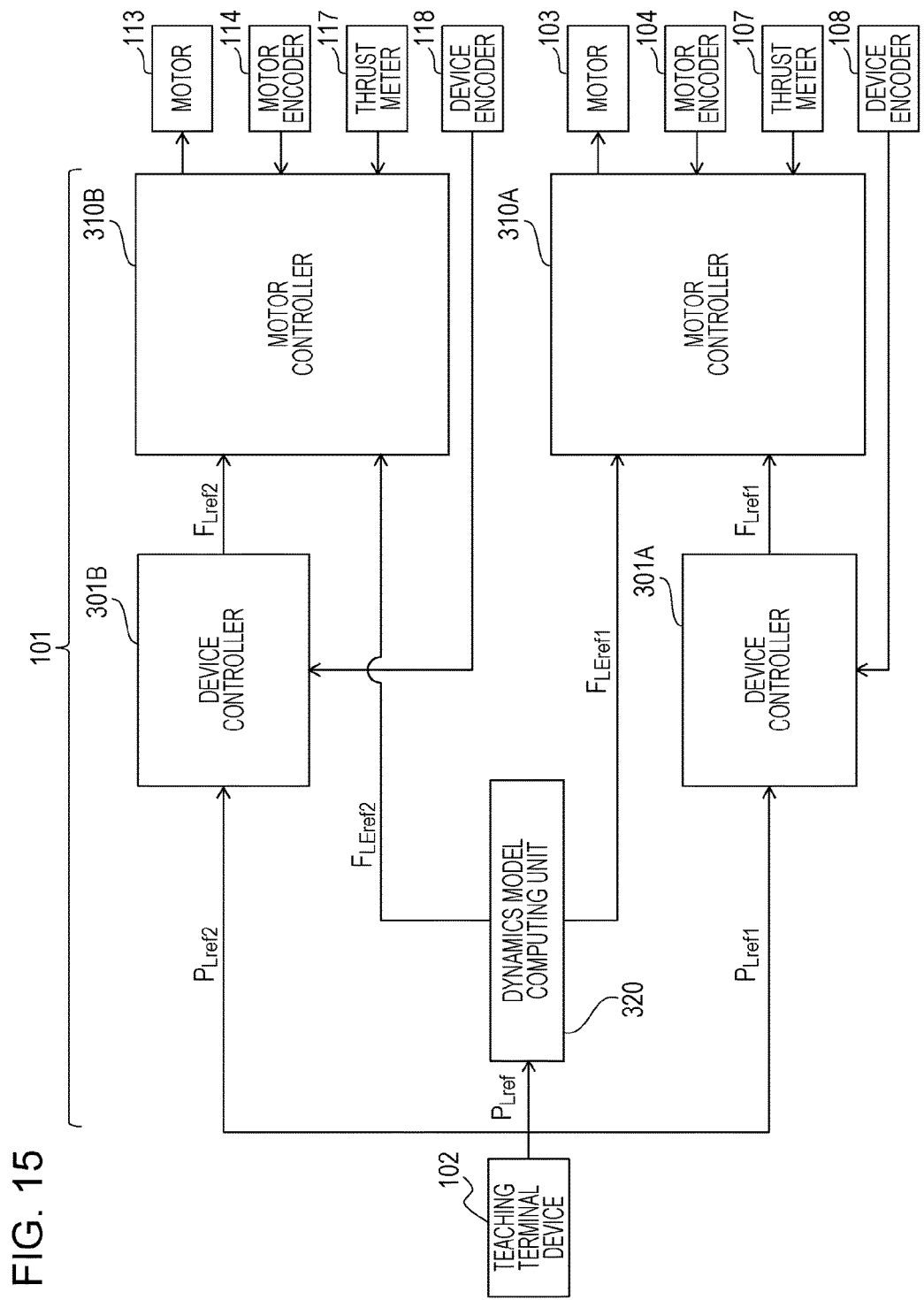
FIG. 15 is a block diagram illustrating a control system of a controller according to a sixth embodiment in a biaxial robot system.

The controller 101 illustrated in FIG. 15 generally includes a device controller 301A and motor controller 310A, and a device controller 301B and motor controller 310B, respectively corresponding to the two motors 103 and 113. The dynamics model computing unit (multi-axial dynamics model control unit) 320 has a dynamics model where the overall robot arm 100 has been modeled according to dynamics, integrated into one. That is to say, the dynamics model computing unit 320 has the functions of calculating expected thrusts $F_{LEref1}$ and $F_{LEref2}$ necessary to control movement of the two arms 106 and 116 with a single dynamics model.

The biaxial robot system $1_2$ having this biaxial robot arm 100 is also controlled so as to operate over a path defined by multiple teaching point strings provided beforehand. Regardless of the number of axes controlled, the path during movement can be followed from the start point to the end point of one action with rapidity and precision, without any vibrations being generated in the robot due to thrust interference between the axes.

Although the sixth embodiment is described as a biaxial robot arm 100, it may be an N-axial articulated robot arm having three or more axes. The dynamics model computing unit 320 is capable of calculating interference thrust between the output shafts of the motors and reducers in a general case where there are multiple axes. Accordingly, multiple axes can be controlled by changing the following three points. A first point is that the position command value $P_{Lref}$ input to the dynamics model computing unit 320 is changed to position command values $P_{Lref1}$ through $P_{LrefN}$ respectively corresponding to the multiple axes (N axes). A second point is that the expected thrust $F_{LEref}$ output from the dynamics model computing unit 320 is changed to expected thrusts $F_{LEref}$ through $F_{LErefN}$ respectively corresponding to the multiple axes (N axes). A third point is that N each of the device controller 301 and motor controller 310 are provided according the N joints, and the position command value $P_{LrefN}$ and expected thrust $F_{LErefN}$ of the n'th joint handling control thereof are input. The device controller 301 and motor controller 310 used are the same as those in the fourth and fifth embodiments. In this case, the controllers controlling the articulated robot arm are included in the control device of the robot device. That is to say, the control device of the robot device can be conceived as being configured including multiple controllers that control the joints, and a higher order computer that outputs position command values to these controllers.

A biaxial robot system having this articulated robot arm is also controlled so as to operate over a path defined by multiple teaching point strings provided beforehand. Regardless of the number of axes controlled, the path during movement can be followed from the start point to the end point of one action with rapidity and precision, without any vibrations being generated in the robot due to thrust interference between the axes.

In a case of controlling multiple axes with the dynamics model computing unit 320 taking into consideration thrust interference among the axes, precision improves by subtracting the calculated value of interference thrust from the calculated value of disturbance, in a robot system having an articulated robot arm, as well. Adding the calculated interference thrust to the thrust command value $F_{Lref}$ (feedforward) further improves the responsivity of the device position FF command value $P_{LFFref}$.

While an arrangement has been described in the first through sixth embodiments where the teaching terminal device 102 is used to apply thrust command values and position command values to the controller 101, this is not restrictive. For example, thrust command values and position command values may be applied to the controller 101 from a separate computer or the like managing the controller 101. In this case, the functions of the units which the controller 101 has may be held by another computer. That is to say, which software functions are installed in which hardware configurations between a servo control device and another computer connected thereto, is a matter of freedom of design.

The present invention also may be realized by supplying a program realizing one or more functions of the above-described embodiments to a system or device via a network or storage medium, with one or more processors in a computer of the system or device reading out and executing the program. The present invention may also be realized by a circuit that realizes one or more functions (e.g., an application specific integrated circuit (ASIC)).

Seventh Embodiment

Figure 16:
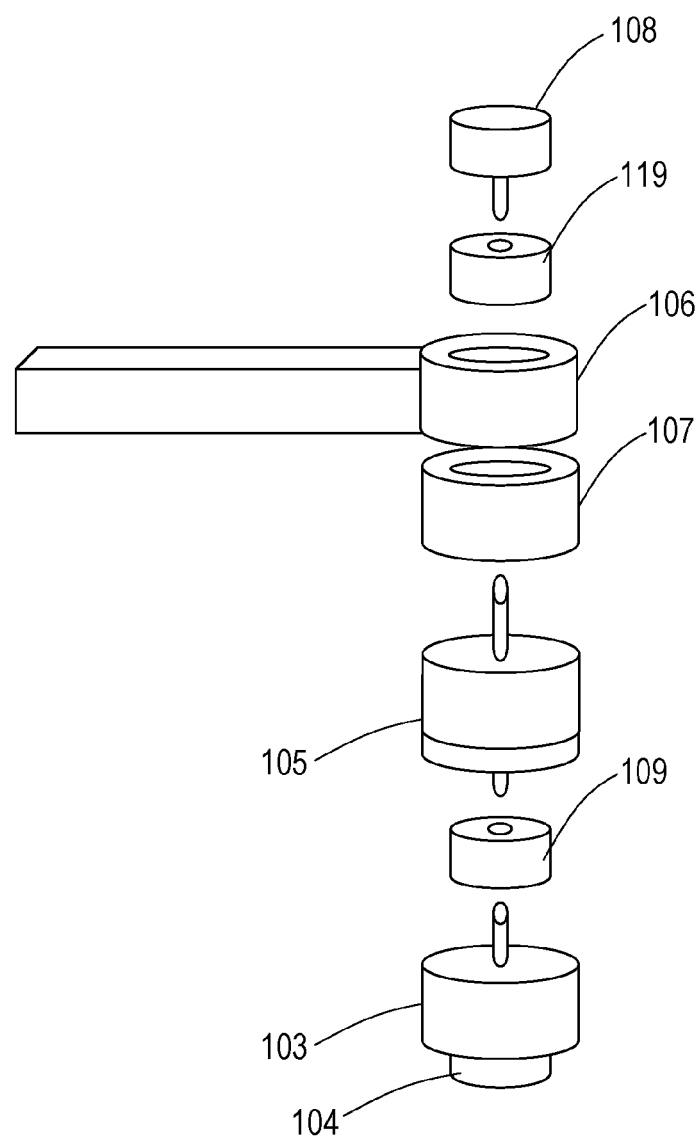
FIG. 16 is a disassembled diagram of a joint according to a seventh embodiment.
Figure 17:
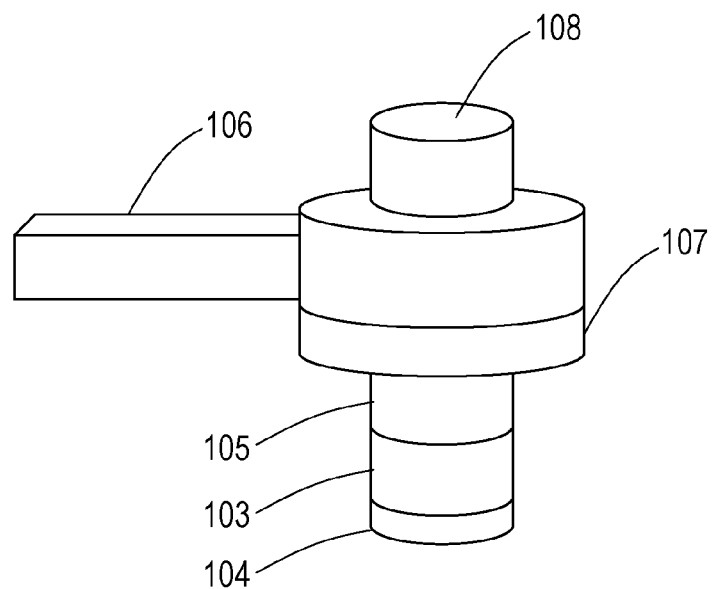
FIG. 17 is a schematic diagram of the joint according to the seventh embodiment.

A specific example of the configuration of a joint will be described with reference to FIGS. 16 through 19, as a seventh embodiment. FIG. 16 is a disassembled diagram of a joint according to the seventh embodiment. FIG. 17 is a schematic diagram of the joint according to the seventh embodiment.

A high-speed rotational shaft passes through the main body of the reducer 105, and is coupled to a shaft, which is the output shaft of the motor 103, by a coupler 109. The main body of the reducer 105 is coupled to the main body of the motor 103, and is rotated by rotation of the motor shaft.

A driving flange of the reducer 105 is coupled to the arm 106 across the thrust meter 107 which is hollow in structure. The reducer 105 is configured so that the driving flange rotates at a number of rotations reduced from the rotations of the main unit of the reducer 105 rotated by the motor 103. A shaft of the device encoder 108 is coupled to the high-speed rotational shaft of the reducer 105 via a coupler 119. The main body of the device encoder 108 is coupled to the arm 106 or the driving flange of the reducer 105. According to this configuration, the position of the arm 106 or the driving flange of the reducer 105, as to rotations of the high-speed rotational shaft of the reducer 105 (i.e., motor rotations), can be detected.

FIG. 17 is a schematic diagram of a joint in a case where the main body of the device encoder 108 has been coupled to the arm 106. The device encoder 108 protrudes from the arm 106, as illustrated in FIG. 17.

Figure 18:
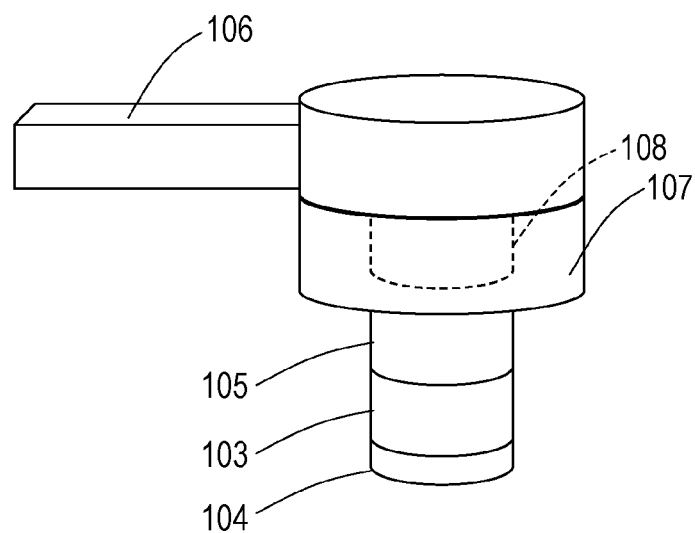
FIG. 18 is a schematic diagram of the joint according to the seventh embodiment.

FIG. 18 is a schematic diagram illustrating a case where the device encoder 108 is disposed in the center portion of the thrust meter 107 that has the hollow structure, so as to be integral. This configuration enables the thrust and position of the device to be measured at the same position, and accordingly cycle deviation can be suppressed. The thrust meter 107, device encoder 108, and reducer 105 are formed separately, so measurement can be performed without being influenced by internal vibrations and heat generated in the reducer 105.

The device encoder 108 measures the position of the arm 106 or the driving flange of the reducer 105, with the rotations of the high-speed rotational shaft of the reducer 105 (i.e., motor rotations) as a reference. Accordingly, correction has to be made according to the position of the high-speed rotational shaft (motor encoder 104) to make measurement with the rotations of the motor as a reference. In a case where the direction of detection by both encoders is the same, such as the clockwise direction being positive for both, the position of the arm 106 is corrected by subtracting the detected value of the motor encoder 104 from the detected value of the device encoder 108.

Figure 19:
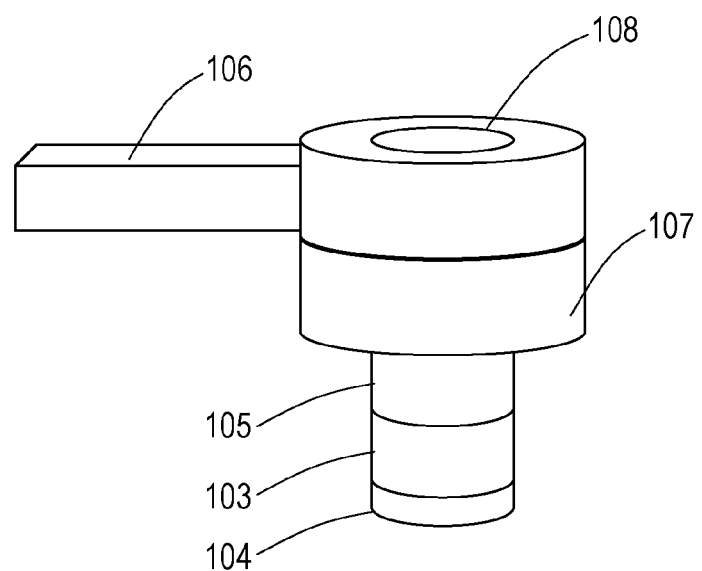
FIG. 19 is a schematic diagram of the joint according to the seventh embodiment.

Although description has been made that the main unit of the device encoder 108 is coupled to the arm 106 or the driving flange of the reducer 105, an arrangement may be made where the device encoder 108 is coupled to the thrust meter 107. FIG. 19 is a schematic diagram of a joint where the device encoder 108 and thrust meter 107 have been coupled. The arm 106 and device encoder 108 may be integrated, as illustrated in FIG. 19.

Eighth Embodiment

Figure 20:
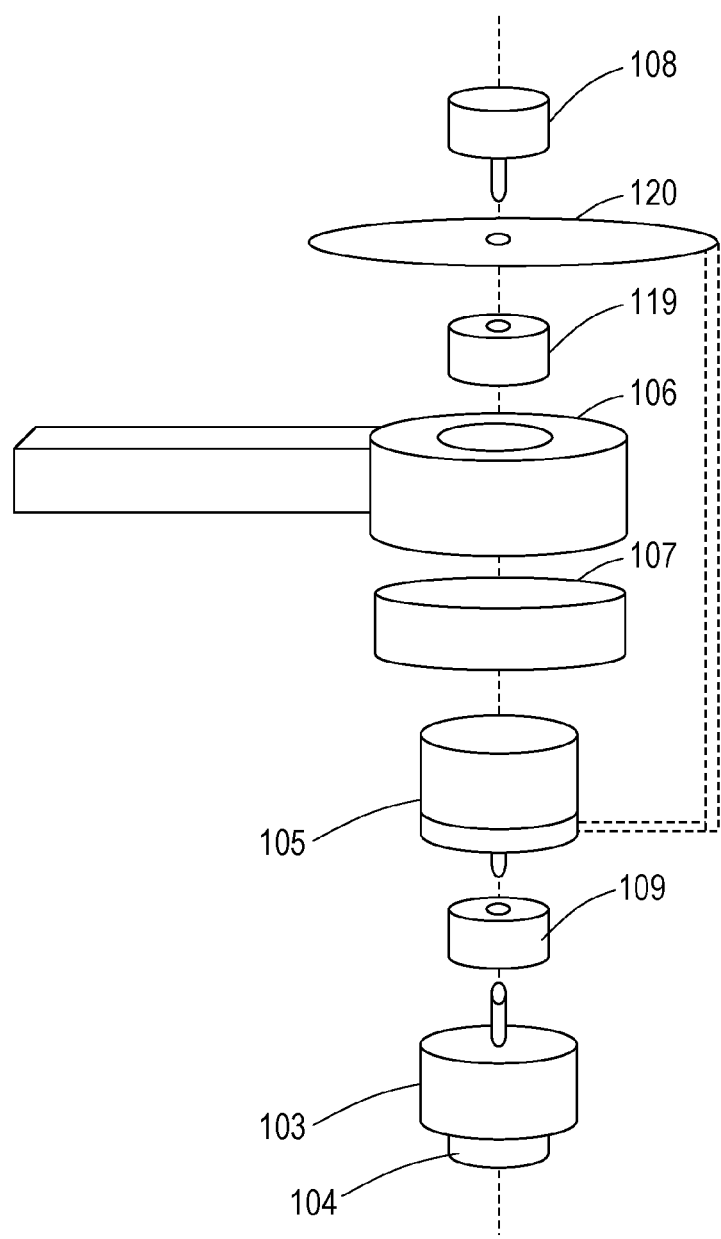
FIG. 20 is a disassembled diagram of a joint according to an eighth embodiment.
Figure 21:
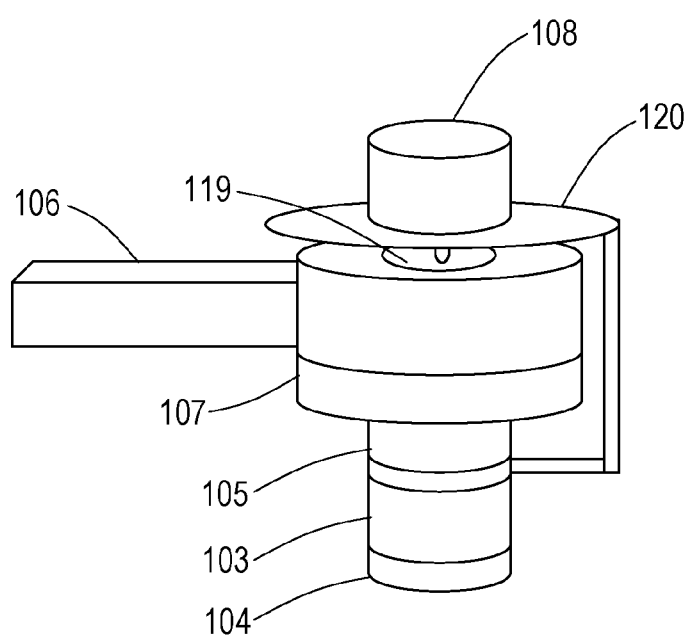
FIG. 21 is a schematic diagram of the joint according to the eighth embodiment.

An example of the configuration of a joint will be described with reference to FIGS. 20 and 21, as an eight embodiment. FIG. 20 is a disassembled diagram of a joint. FIG. 21 is a schematic diagram of the joint.

The reducer 105 has its high-speed rotational shaft coupled to the shaft of the motor 103 by the coupler 109. The main unit of the reducer 105 is coupled to the main unit of the motor 103. The driving flange of the reducer 105 is coupled to the arm 106 across the thrust meter 107. The shaft of the device encoder 108 is coupled to the driving flange of the reducer 105 or the thrust meter 107 or the arm 106, via the coupler 119. The main body of the device encoder 108 is coupled to the main unit of the reducer 105 or an encoder attachment structure 120 coupled to the motor. This configuration enables the thrust and position to be measured at the same position, without using the aforementioned correction.

Other Embodiments

Embodiment(s) of the present invention can also be realized by a computer of a system or device that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or device by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-236150, filed Nov. 21, 2014, which is hereby incorporated by reference herein in its entirety.

What is claimed is:

1. A motor drive device configured to perform motion control of a moving member via a transmission mechanism connected to a motor, the motor drive device comprising:
   a thrust control unit configured to generate a position command value for the motor based on an input thrust command value; and
   a motor control unit configured to generate a current value to control the motor based on the position command value for the motor,
   wherein
      the motor control unit executes a first feedback control according to detection results of a motor position detecting unit configured to detect a position of an output member that outputs rotation of the motor, and
      the thrust control unit executes a second feedback control according to detection results of a thrust detecting unit configured to detect thrust occurring at the moving member.

2. The motor drive device according to claim 1,
   wherein the motor control unit includes
      a motor position control unit configured to generate a speed command value for the motor, based on the position command value for the motor generated by the thrust control unit,
      a motor speed control unit configured to generate the thrust command value for the motor based on the speed command value for the motor generated by the motor position control unit, and
      a current control unit configured to generate the current value based on the thrust command value for the motor generated by the speed control unit,
   wherein detection results from the motor position detecting unit are at least one of
      the detected position of the output member of the motor, speed of the output member of the motor obtained by differentiation of the detected position of the output member, and acceleration of the output member of the motor obtained by second order differentiation of the detected position of the output member, and wherein at least one of feedback control by the motor position control unit in accordance with the position of the output member of the motor, feedback control by the motor speed control unit in accordance with the speed of the output member of the motor, and feedback control by the current control unit in accordance with acceleration of the output member of the motor, is performed as the first feedback control.

3. The motor drive device according to claim 1, further comprising:

a motor feed-forward (FF) control unit configured to generate a feed-forward value to perform feed-forward control of the motor control unit, in accordance with the position command value for the motor generated by the thrust control unit.

4. The motor drive device according to claim 3, wherein the motor FF control unit generates the feed-forward value using an ideal model where the motor control unit has been modeled.

5. The motor drive device according to claim 4, wherein the ideal model includes an inertia virtual model where inertia of the motor has been modeled, and a circuit virtual model where a feeder circuit of the motor has been modeled with a predetermined control gain having been set.

6. The motor drive device according to claim 1, further comprising:

a dynamics model control unit configured to generate a prediction value of dynamic thrust, from the externally input position command value for the moving member, by a dynamics model where the motor drive device has been modeled according to dynamics.

7. The motor drive device according to claim 6, wherein the thrust control unit executes feed-forward control in accordance with the prediction value of dynamic thrust.

8. The motor drive device according to claim 6, further comprising:

a twist amount control unit configured to generate a prediction value of a twist amount of the motor drive device from the prediction value of dynamic thrust, based on rigidity of the motor drive device.

9. The motor drive device according to claim 1, further comprising:

a drive device control unit configured to generate the thrust command value to be input to the thrust control unit, based on the externally input position command value for the moving member, wherein the drive device control unit executes a third feedback control in accordance with detection results from a moving member position detecting unit configured to detect the position of the moving member.

10. The motor drive device according to claim 9, wherein the drive device control unit includes a moving member position control unit configured to generate a speed command value for the moving member, based on the externally input position command value for the moving member, and a moving member speed control unit configured to generate a thrust command value for the moving member, based on the speed command value for the moving member generated by the moving member position control unit, and wherein detection results from the moving member position detecting unit are at least one of the detected position of the moving member, and speed of the moving member obtained by differentiation of the detected position of the moving member, and wherein at least one of feedback control by the moving member position control unit in accordance with the position of the moving member, and feedback control by the moving member speed control unit in accordance with the speed of the moving member, is performed as the third feedback control.

11. The motor drive device according to claim 9, further comprising:

a drive device FF control unit configured to generate a feed-forward value for feed-forward control of the drive device control unit, in accordance with the externally input position command value for the moving member.

12. The motor drive device according to claim 11, wherein the drive device FF control unit generates the feed-forward value by an ideal model where the motor drive device has been modeled.

13. The motor drive device according to claim 9, further comprising:

a monitoring control unit configured to generate thrust occurring at the moving member due to disturbance, based on the detection results from the thrust detecting unit and the detection results from the moving member position detecting unit, wherein the thrust control unit executes a fourth feedback control in accordance with the thrust occurring due to disturbance.

14. A robot device having a plurality of arms driven via a plurality of joints, one joint of the plurality of joints that drives one arm of the plurality of arms comprising:

a reducer connected to an output shaft of a motor, the reducer including a driving flange;

a thrust meter configured to obtain thrust transmitted from the reducer to the one arm, the thrust meter being connected to the driving flange of the reducer and the one arm;

a device encoder configured to obtain the position of the one arm, the device encoder being coupled to the one arm or the driving flange of the reducer; and a motor encoder configured to obtain a rotational position of the output shaft of the motor.

15. A robot device having a plurality of arms driven via a plurality of joints, one joint of the plurality of joints that drives one arm of the plurality of arms comprising:

a reducer;

a thrust meter;

a device encoder; and a motor encoder configured to obtain a rotational position of an output shaft of a motor, wherein a high-speed rotational shaft of the reducer is connected to the output shaft of the motor, and the reducer includes a driving flange, wherein the thrust meter is connected to the driving flange of the reducer and the one arm, and wherein the device encoder is connected to the arm and the high-speed rotational shaft of the reducer.

\* \* \* \* \*